United States Patent
Liu et al.

(10) Patent No.: US 12,400,657 B2
(45) Date of Patent: Aug. 26, 2025

(54) AUDIO MATCHING METHOD AND RELATED DEVICE FOR ROBOT CONTROL BASED ON CALCULATING A ROTATION ANGLE

(71) Applicant: HUAWEI TECHNOLOGIES CO., LTD., Shenzhen (CN)

(72) Inventors: Heng Liu, Beijing (CN); Zhigang Li, Beijing (CN); Mingyu Yu, Shenzhen (CN); Huimin Che, Beijing (CN); Honglei Zhang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 288 days.

(21) Appl. No.: 17/780,384

(22) PCT Filed: Nov. 17, 2020

(86) PCT No.: PCT/CN2020/129464
§ 371 (c)(1),
(2) Date: May 26, 2022

(87) PCT Pub. No.: WO2021/104110
PCT Pub. Date: Jun. 3, 2021

(65) Prior Publication Data
US 2023/0008363 A1    Jan. 12, 2023

(30) Foreign Application Priority Data
Nov. 30, 2019    (CN) .......................... 201911209345.7

(51) Int. Cl.
*G10L 15/22*    (2006.01)
*G06V 10/774*    (2022.01)
(Continued)

(52) U.S. Cl.
CPC .............. *G10L 15/25* (2013.01); *G10L 15/02* (2013.01); *G10L 15/063* (2013.01);
(Continued)

(58) Field of Classification Search
CPC ....... G10L 15/02; G10L 15/063; G10L 15/24; G10L 15/25; G10L 17/00; G10L 17/04; G10L 17/10; G10L 17/18; G06V 10/774
See application file for complete search history.

(56) References Cited

U.S. PATENT DOCUMENTS

| | | | |
|---|---|---|---|
| 11,705,133 B1* | 7/2023 | Aggarwal | G10L 25/51 704/246 |
| 2012/0249468 A1* | 10/2012 | Cole | G06F 3/012 345/174 |

(Continued)

FOREIGN PATENT DOCUMENTS

| | | |
|---|---|---|
| CN | 102194456 A | 9/2011 |
| CN | 102682273 A | 9/2012 |

(Continued)

OTHER PUBLICATIONS

Wark, Tim, and Sridha Sridharan. "Adaptive fusion of speech and lip information for robust speaker identification." Digital Signal Processing 11.3 (2001): 169-186.*

(Continued)

*Primary Examiner* — Farzad Kazeminezhad
(74) *Attorney, Agent, or Firm* — Rimon PC

(57) ABSTRACT

Embodiments of the present application disclose an audio matching method and a related device. The audio matching method includes: obtaining audio data and video data; extracting to-be-recognized audio information from the audio data; extracting lip movement information of N users from the video data, where N is an integer greater than 1; inputting the to-be-recognized audio information and the lip (Continued)

movement information of the N users into a target feature matching model, to obtain a matching degree between each of the lip movement information of the N users and the to-be-recognized audio information; and determining a user corresponding to the lip movement information of the user with the highest matching degree as the target user to which the to-be-recognized audio information belongs.

20 Claims, 20 Drawing Sheets

(51) Int. Cl.
*G10L 15/02* (2006.01)
*G10L 15/06* (2013.01)
*G10L 15/25* (2013.01)
*G10L 17/18* (2013.01)
*G10L 17/22* (2013.01)

(52) U.S. Cl.
CPC ............ *G06V 10/774* (2022.01); *G10L 17/18* (2013.01); *G10L 17/22* (2013.01)

(56) References Cited

U.S. PATENT DOCUMENTS

| | | | |
|---|---|---|---|
| 2015/0088515 A1* | 3/2015 | Beaumont | G10L 17/06 704/251 |
| 2019/0251970 A1* | 8/2019 | Shukla | G10L 15/25 |
| 2019/0259388 A1* | 8/2019 | Carpenter, II | G10L 17/06 |
| 2019/0313014 A1* | 10/2019 | Welbourne | G06V 40/70 |
| 2019/0341054 A1* | 11/2019 | Krupka | G06V 10/764 |
| 2019/0341058 A1 | 11/2019 | Zhang et al. | |
| 2020/0145241 A1* | 5/2020 | Anderson | G06F 18/29 |
| 2020/0349953 A1* | 11/2020 | Qin | G10L 15/26 |
| 2021/0151058 A1* | 5/2021 | Cheung | G10L 17/00 |

FOREIGN PATENT DOCUMENTS

| | | |
|---|---|---|
| CN | 106055662 A | 10/2016 |
| CN | 106127156 A | 11/2016 |
| CN | 107293300 A | 10/2017 |
| CN | 108121823 A | 6/2018 |
| CN | 108564943 A | 9/2018 |
| CN | 109410954 A | 3/2019 |
| CN | 109410957 A | 3/2019 |
| CN | 110276259 A | 9/2019 |
| CN | 110475093 A | 11/2019 |
| CN | 110517295 A | 11/2019 |
| CN | 111091824 A | 5/2020 |
| WO | 2019150708 A1 | 8/2019 |
| WO | WO 2021/101500 A1 * | 5/2021 ........... G06V 10/774 |

OTHER PUBLICATIONS

Palanivel, S., and B. Yegnanarayana. "Multimodal person authentication using speech, face and visual speech." Computer Vision and Image Understanding 109.1 (2008): 44-55.*
Asadpour, Vahid, Mohammad Mehdi Homayounpour, and Farzad Towhidkhah. "Audio-visual speaker identification using dynamic facial movements and utterance phonetic content." Applied Soft Computing 11.2 (2011): 2083-2093.*
Chelali, Fatma, and Amar Djeradi. "Audiovisual Speaker Identification Based on Lip and Speech Modalities." International Arab Journal of Information Technology (IAJIT) 14.1 (2017).*
Ahmad, Rehan, et al. "Multimodal speaker diarization using a pre-trained audio-visual synchronization model." Sensors 19.23 (2019): 5163.*
Translation of CN-109410954-A 2019.*
Amirsina Torfi, et al., "3D Convolutional Neural Networks for Cross Audio-Visual Matching Recognition", arxiv.org, Cornell University Library, 201 Olin Library Cornell University Ithaca, NY 14853, Jun. 19, 2017 (Jun. 19, 2017); XP081291678; 11 pages.
A. Hakamata, F. Ren and S. Tsuchiya, "Human Emotion Model Based on Discourse Sentence for Expression Generation of Conversation Agent", 2008 International Conference on Natural Language Processing and Knowledge Engineering, Beijing, China, 2008, doi: 10.1109/NLPKE.2008.4906812; 8 pages.
Katsaggelos Aggelos K, et al., "Audiovisual Fusion: Challenges and New Approaches", Proceedings of the IEEE, New York, US, vol. 103, No. 9, Sep. 1, 2015 (Sep. 1, 2015), XP011667043; pp. 1635-1653.

* cited by examiner

AUDIO MATCHING METHOD AND RELATED DEVICE FOR ROBOT CONTROL BASED ON CALCULATING A ROTATION ANGLE

This application is a national stage of International Application No. PCT/CN2020/129464, filed on Nov. 17, 2020, which claims priority to Chinese Patent Application No. 201911209345.7, filed on Nov. 30, 2019. The disclosures of the aforementioned applications are hereby incorporated by reference in their entireties.

TECHNICAL FIELD

The present application relates to the field of human-computer interaction technologies, and in particular, to an audio matching method and a related device.

BACKGROUND

Human-computer interaction (HCI) studies information exchange between humans and computers, primarily including information exchange from humans to computers and information exchange from computers to humans. Human-computer interaction is a comprehensive subject closely related to cognitive psychology, ergonomics, multimedia technologies, and virtual reality technologies. In human-computer interaction technologies, a multimodal interaction device is an interaction device that implements in parallel a plurality of interaction modes such as speech interaction, somatosensory interaction, and touch interaction. In human-computer interaction of the multimodal interaction device, user information is collected by a plurality of tracking modules (face, gesture, posture, audio, and rhythm) in the interaction device, and is then interpreted, processed, and managed to form a virtual user expression module; and an interactive dialog is carried on with a computer. In this way, user interaction experience is greatly improved.

For example, there are some intelligent robot products on the market that can interact with people, and it is proposed that robots are used to replace people as spiritual companions to accompany the elderlies and kids. However, friendliness in the human-computer interaction represents a higher requirement from people as served objects for a robot system. To be specific, a human-computer dialog is implemented in a manner of natural communication that is closer to communication between people. To truly meet the functional requirement of emotional care for the elderlies and kids and better integrate into their lives, a robot needs to fully understand the intent of a user first, understand the psychological and emotional change of the user, and perform personalized interactions based on the characteristics and requirements of different users.

However, in a relatively complex scenario, when a robot communicates with a plurality of persons face to face (such as multi-person teaching, multi-player gaming, and family daily life), the robot on the current market cannot quickly and accurately determine the identity of an interaction object, and can only perform interaction in a predetermined programmed interaction manner. Consequently, interaction experience is greatly affected. For example, in a scenario in which three children of a family interact with a robot, elder brother Tom plans to go for an outing tomorrow and little brother Jerry clamors to go with Tom, but sister Kris tells Tom there is a rainstorm tomorrow, so Tom is very depressed and asks the robot "What's the weather like tomorrow". After receiving the audio instruction, the robot only answers based on the result of a semantic recognition performed on the received audio information: "It is sunny tomorrow, with a breeze level of 2 to 3." In this case, Tom's feelings are not considered. Consequently, intelligent and personalized human-computer interaction cannot be implemented.

SUMMARY

Embodiments of the present application provide an audio matching method, a neural network training method, and a related device, to improve audio matching efficiency and human-computer interaction experience in a multi-person scenario.

According to a first aspect, an embodiment of the present application provides an audio matching method. The method may include: obtaining audio data and video data; extracting to-be-recognized audio information from the audio data, where the to-be-recognized audio information includes an audio waveform sequence in a target time period; extracting lip movement information of N users from the video data, where each of the lip movement information of the N users includes a sequence of lip movement images of a corresponding user in the target time period, and N is an integer greater than 1; inputting the to-be-recognized audio information and the lip movement information of the N users into a target feature matching model, to obtain a matching degree between each of the lip movement information of the N users and the to-be-recognized audio information; and determining a user corresponding to the lip movement information of the user with the highest matching degree as the target user to which the to-be-recognized audio information belongs.

In an embodiment of the present application, when the method is applied to a multi-person dialog scenario, audio data and video data may be collected, and audio information in the audio data may be matched with lip movement information in the video data, so that the target user to which the to-be-recognized audio information belongs can be determined. To be specific, in the multi-person scenario, an audio feature is matched with lip movement features of a plurality of users, to recognize the specific user that sends the piece of to-be-recognized audio information, and then further control or a further operation may be performed based on the recognition result. Different from the conventional technology in which a voiceprint recognition technology or a sound source localization technology is used, the method in this embodiment of the present application does not depend on the sound of a person (a voiceprint is easily affected by the physical condition, age, emotion, and the like of the person), is not interfered by the environment (for example, noise interference in the environment), provides a strong anti-interference capability, and has high recognition efficiency and accuracy. The to-be-recognized audio information includes an audio waveform sequence in a specific time period, and the lip movement information of the N users includes sequences of lip movement images (namely, lip movement videos) of the plurality of users in the time period in the same scenario, to facilitate subsequent related feature extraction and feature matching. The target feature matching model is used, the to-be-recognized audio information and the lip movement information of the N users are used as inputs of the target feature matching model, the matching degree between each of the lip movement information of the N users and the to-be-recognized audio information is used as an output of the target feature matching model, and the target user to which the to-be-recognized audio information belongs is determined based on the matching degree. Optionally, the target feature matching model is a neural network model.

In a possible implementation, the target feature matching model includes a first model, a second model, and a third model; and the inputting the to-be-recognized audio information and the lip movement information of the N users into a target feature matching model, to obtain a matching degree between each of the lip movement information of the N users and the to-be-recognized audio information includes: inputting the to-be-recognized audio information into the first model, to obtain an audio feature, where the audio feature is a K-dimensional audio feature, and K is an integer greater than 0; inputting the lip movement information of the N users into the second model, to obtain N image sequence features, where each of the N image sequence features is a K-dimensional image sequence feature; and inputting the audio feature and the N image sequence features into the third model, to obtain a matching degree between each of the N image sequence features and the audio feature. In an embodiment of the present application, feature extraction is performed on the to-be-recognized audio information and the lip movement information of the N users by respectively using the first model and the second model of the target feature matching model (which may also be considered as a dimension reduction process). In this way, after feature extraction is performed on the to-be-recognized audio information and the lip movement information of the N users by respectively using the first model and the second network, features with the same dimension can be obtained, and feature normalization can be implemented for different types of information. In other words, after feature extraction processing by the foregoing network is performed, different types of raw data (the to-be-recognized audio information and the lip movement information of the N users) can be converted into dimensionless index values (the audio feature and the N image sequence features are all K-dimensional features in this embodiment of the present application), and the index values are at the same quantity level. In addition, comprehensive assessment and analysis (namely, feature matching in this embodiment of the present application) can be performed on the index values.

In a possible implementation, the target feature matching model is a feature matching model obtained through training by using lip movement information of a trained user and M pieces of audio information as inputs and by using matching degrees between the lip movement information of the trained user and the M pieces of audio information as M labels. Optionally, the M pieces of audio information include audio information that matches the lip movement information of the trained user and (M−1) pieces of audio information that do not match the lip movement information of the trained user. In an embodiment of the present application, the target feature matching model is obtained by training an initialized neural network model by using a piece of lip movement information of a trained user, audio information that matches the trained lip movement information, and a plurality of pieces of audio information that do not match the trained lip movement information as inputs of the target feature matching model and by using actual matching degrees between the M pieces of audio information and the lip movement information of the trained user as labels. For example, a matching degree corresponding to complete matching, namely, a label, is 1, and a matching degree corresponding to non-matching, namely, a label, is 0.

In a possible implementation, the method further includes: determining user information of the target user, where the user information includes one or more of character attribute information, facial expression information corresponding to the to-be-recognized audio information, and environment information corresponding to the to-be-recognized audio information; and generating, based on the user information, a control instruction that matches the user information. In an embodiment of the present application, after the specific target user that sends the to-be-recognized audio information in the current scenario is determined, the control instruction (for example, an audio instruction or an operation instruction) that matches the user information may be determined based on the attribute information (for example, gender, age, and personality) of the user, the facial expression information (for example, an expression corresponding to the to-be-recognized audio information sent by the target user), and the corresponding environment information (for example, the target user is currently in an office environment, a home environment, or an entertainment environment). For example, a smart robot is controlled to send audio, an operation, or the like that matches the expression data, the character attribute information, and the like to the target user, where the audio or the operation includes a tone of the robot, a head turning of the robot, and reply content of the robot.

In a possible implementation, the extracting lip movement information of N users from the video data includes: recognizing N face regions in the video data based on a face recognition algorithm, and extracting a lip movement video in each of the N face regions; and determining the lip movement information of the N users based on the lip movement video in each face region. In an embodiment of the present application, the face regions are first recognized from the video data, then the lip movement video in each face region is extracted based on the face regions, and the lip movement information of the N users, namely, sequences of lip movement images of corresponding users, are determined based on lip movement videos.

In a possible implementation, the extracting to-be-recognized audio information from the audio data includes: recognizing audio data with different spectrums from the audio data based on a spectrum recognition algorithm, and recognizing audio data with a target spectrum as the to-be-recognized audio information. Spectrums corresponding to sounds sent by different users are usually different. Therefore, in this embodiment of the present application, the audio data with the different spectrums is first recognized from the audio data, and the audio data with the target spectrum is then recognized as the to-be-recognized audio information, to implement the function of extracting the to-be-recognized audio information from the audio data.

According to a second aspect, an embodiment of the present application provides a neural network training method. The method may include:

obtaining training samples, where the training samples include lip movement information of a trained user and M pieces of audio information, and the M pieces of audio information include audio information that matches the lip movement information of the trained user and (M−1) pieces of audio information that do not match the lip movement information of the trained user; and training an initialized neural network by using the lip movement information of the trained user and the M pieces of audio information as training inputs and by using matching degrees between the lip movement information of the trained user and the M pieces of audio information as M labels, to obtain a target feature matching model.

In an embodiment of the present application, the target feature matching model is obtained by training the initialized neural network model by using lip movement information of a trained user, audio information that matches the lip movement information of the trained user, and a plurality of pieces of audio information that do not match the lip movement information of the trained user as inputs of the initialized neural network and by using actual matching degrees between the M pieces of audio information and the lip movement information of the trained user as labels. For example, a matching degree corresponding to complete matching, namely, a label, is 1, and a matching degree corresponding to non-matching, namely, a label, is 0. If matching degrees that are between the M pieces of audio information and the lip movement information of the trained user and that are obtained through calculation by using a trained initialized neural network are closer to the M labels, the trained initialized neural network is closer to the target feature matching model.

In a possible implementation, the lip movement information of the trained user includes a sequence of lip movement images of the trained user, and the M pieces of audio information include one audio waveform sequence that matches the sequence of lip movement images of the trained user and (M−1) audio waveform sequences that do not match the sequence of lip movement images of the trained user.

In a possible implementation, the training an initialized neural network by using the lip movement information of the trained user and the M pieces of audio information as training inputs and by using matching degrees between the lip movement information of the trained user and the M pieces of audio information as M labels, to obtain a target feature matching model includes:
  inputting the lip movement information of the trained user and the M pieces of audio information into the initialized neural network, to calculate the matching degrees between the M pieces of audio information and the lip movement information of the trained user; and
  comparing the calculated matching degrees between the M pieces of audio information and the lip movement information of the trained user with the M labels, and training the initialized neural network, to obtain the target feature matching model.

In a possible implementation, the target feature matching model includes a first model, a second model, and a third model; and
  the inputting the lip movement information of the trained user and the M pieces of audio information into the initialized neural network, to calculate the matching degrees between the M pieces of audio information and the lip movement information of the trained user includes:
  inputting the M pieces of audio information into the first model, to obtain M audio features, where each of the M audio features is a K-dimensional audio feature, and K is an integer greater than 0;
  inputting the lip movement information of the trained user into the second model, to obtain an image sequence feature of the trained user, where the image sequence feature of the trained user is a K-dimensional image sequence feature; and
  inputting the M audio features and the image sequence feature of the trained user into the third model, to calculate matching degrees between the M audio features and the image sequence feature of the trained user.

According to a third aspect, an embodiment of the present application provides a smart device. The smart device may include a processor, and a microphone and a camera that are coupled to the processor.

The microphone is configured to collect audio data.

The camera is configured to collect video data, where the audio data and the video data are collected in the same scenario.

The processor is configured to:
  obtain the audio data and the video data;
  extract to-be-recognized audio information from the audio data, where the to-be-recognized audio information includes an audio waveform sequence in a target time period;
  extract lip movement information of N users from the video data, where each of the lip movement information of the N users includes a sequence of lip movement images of a corresponding user in the target time period, and N is an integer greater than 1;
  input the to-be-recognized audio information and the lip movement information of the N users into a target feature matching model, to obtain a matching degree between each of the lip movement information of the N users and the to-be-recognized audio information; and
  determine a user corresponding to the lip movement information of the user with the highest matching degree as the target user to which the to-be-recognized audio information belongs.

In a possible implementation, the target feature matching model includes a first model, a second model, and a third model; and the processor is configured to:
  input the to-be-recognized audio information into the first model, to obtain an audio feature, where the audio feature is a K-dimensional audio feature, and K is an integer greater than 0;
  input the lip movement information of the N users into the second model, to obtain N image sequence features, where each of the N image sequence features is a K-dimensional image sequence feature; and
  input the audio feature and the N image sequence features into the third model, to obtain a matching degree between each of the N image sequence features and the audio feature.

In a possible implementation, the target feature matching model is a feature matching model obtained through training by using lip movement information of a trained user and M pieces of audio information as inputs and by using matching degrees between the lip movement information of the trained user and the M pieces of audio information as M labels. Optionally, the M pieces of audio information include audio information that matches the lip movement information of the trained user.

In a possible implementation, the processor is further configured to:
  determine user information of the target user, where the user information includes one or more of character attribute information, facial expression information corresponding to the to-be-recognized audio information, and environment information corresponding to the to-be-recognized audio information; and
  generate, based on the user information, a control instruction that matches the user information.

In a possible implementation, the processor is configured to:
  recognize N face regions in the video data based on a face recognition algorithm, and extract a lip movement video in each of the N face regions; and determine the lip movement information of the N users based on the lip movement video in each face region.

In a possible implementation, the processor is configured to:

recognize audio data with different spectrums from the audio data based on a spectrum recognition algorithm, and recognize audio data with a target spectrum as the to-be-recognized audio information.

According to a fourth aspect, an embodiment of the present application provides a smart device. The smart device may include a processor, and a microphone, a camera, and a neural network processor that are coupled to the processor.

The microphone is configured to collect audio data.

The camera is configured to collect video data, where the audio data and the video data are collected in the same scenario.

The processor is configured to:

obtain the audio data and the video data;

extract to-be-recognized audio information from the audio data, where the to-be-recognized audio information includes an audio waveform sequence in a target time period; and extract lip movement information of N users from the video data, where each of the lip movement information of the N users includes a sequence of lip movement images of a corresponding user in the target time period, and N is an integer greater than 1;

The neural network processor is configured to:

input the to-be-recognized audio information and the lip movement information of the N users into a target feature matching model, to obtain a matching degree between each of the lip movement information of the N users and the to-be-recognized audio information; and determine a user corresponding to the lip movement information of the user with the highest matching degree as the target user to which the to-be-recognized audio information belongs.

In a possible implementation, the target feature matching model includes a first model, a second model, and a third model; and the neural network processor is configured to:

input the to-be-recognized audio information into the first model, to obtain an audio feature, where the audio feature is a K-dimensional audio feature, and K is an integer greater than 0;

input the lip movement information of the N users into the second model, to obtain N image sequence features, where each of the N image sequence features is a K-dimensional image sequence feature; and input the audio feature and the N image sequence features into the third model, to obtain a matching degree between each of the N image sequence features and the audio feature.

In a possible implementation, the target feature matching model is a feature matching model obtained through training by using lip movement information of a trained user and M pieces of audio information as inputs and by using matching degrees between the lip movement information of the trained user and the M pieces of audio information as M labels. Optionally, the M pieces of audio information include audio information that matches the lip movement information of the trained user.

In a possible implementation, the processor is further configured to:

determine user information of the target user, where the user information includes one or more of character attribute information, facial expression information corresponding to the to-be-recognized audio information, and environment information corresponding to the to-be-recognized audio information; and generate, based on the user information, a control instruction that matches the user information.

In a possible implementation, the processor is configured to:

recognize N face regions in the video data based on a face recognition algorithm, and extract a lip movement video in each of the N face regions; and determine the lip movement information of the N users based on the lip movement video in each face region.

In a possible implementation, the processor is configured to:

recognize audio data with different spectrums from the audio data based on a spectrum recognition algorithm, and recognize audio data with a target spectrum as the to-be-recognized audio information.

According to a fifth aspect, an embodiment of the present application provides an audio matching apparatus. The apparatus may include:

an obtaining unit, configured to obtain audio data and video data;

a first extraction unit, configured to extract to-be-recognized audio information from the audio data, where the to-be-recognized audio information includes an audio waveform sequence in a target time period;

a second extraction unit, configured to extract lip movement information of N users from the video data, where each of the lip movement information of the N users includes a sequence of lip movement images of a corresponding user in the target time period, and N is an integer greater than 1;

a matching unit, configured to input the to-be-recognized audio information and the lip movement information of the N users into a target feature matching model, to obtain a matching degree between each of the lip movement information of the N users and the to-be-recognized audio information; and a determining unit, configured to determine a user corresponding to the lip movement information of the user with the highest matching degree as the target user to which the to-be-recognized audio information belongs.

In a possible implementation, the target feature matching model includes a first network, a second network, and a third network; and the matching unit is configured to:

input the to-be-recognized audio information into the first network, to obtain an audio feature, where the audio feature is a K-dimensional audio feature, and K is an integer greater than 0;

input the lip movement information of the N users into the second network, to obtain N image sequence features, where each of the N image sequence features is a K-dimensional image sequence feature; and input the audio feature and the N image sequence features into the third network, to obtain a matching degree between each of the N image sequence features and the audio feature.

In a possible implementation, the target feature matching model is a feature matching model obtained through training by using lip movement information of a trained user and M pieces of audio information as inputs and by using matching degrees between the lip movement information of the trained user and the M pieces of audio information as M labels. Optionally, the M pieces of audio information include audio information that matches the lip movement information of the trained user and (M−1) pieces of audio information that do not match the lip movement information of the trained user.

In a possible implementation, the apparatus further includes:

a determining unit, configured to determine user information of the target user, where the user information includes one or more of character attribute information, facial expression information corresponding to the to-be-recognized audio information, and environment information corresponding to the to-be-recognized audio information; and a control unit, configured to generate, based on the user information, a control instruction that matches the user information.

In a possible implementation, the first extraction unit is configured to:

recognize audio data with different spectrums from the audio data based on a spectrum recognition algorithm, and recognize audio data with a target spectrum as the to-be-recognized audio information.

In a possible implementation, the second extraction unit is configured to:

recognize N face regions in the video data based on a face recognition algorithm, and extract a lip movement video in each of the N face regions; and determine the lip movement information of the N users based on the lip movement video in each face region.

According to a sixth aspect, an embodiment of the present application provides a neural network training apparatus. The apparatus may include:

an obtaining unit, configured to obtain training samples, where the training samples include lip movement information of a trained user and M pieces of audio information, and the M pieces of audio information include audio information that matches the lip movement information of the trained user and (M−1) pieces of audio information that do not match the lip movement information of the trained user; and a training unit, configured to train an initialized neural network by using the lip movement information of the trained user and the M pieces of audio information as training inputs and by using matching degrees between the lip movement information of the trained user and the M pieces of audio information as M labels, to obtain a target feature matching model.

In a possible implementation, the lip movement information of the trained user includes a sequence of lip movement images of the trained user. Optionally, the M pieces of audio information include one audio waveform sequence that matches the sequence of lip movement images of the trained user and (M−1) audio waveform sequences that do not match the sequence of lip movement images of the trained user.

In a possible implementation, the training unit is configured to:

input the lip movement information of the trained user and the M pieces of audio information into the initialized neural network, to calculate the matching degrees between the M pieces of audio information and the lip movement information of the trained user; and compare the calculated matching degrees between the M pieces of audio information and the lip movement information of the trained user with the M labels, and train the initialized neural network, to obtain the target feature matching model.

In a possible implementation, the target feature matching model includes a first model, a second model, and a third model; and the training unit is configured to:

input the M pieces of audio information into the first model, to obtain M audio features, where each of the M audio features is a K-dimensional audio feature, and K is an integer greater than 0;

input the lip movement information of the trained user into the second model, to obtain an image sequence feature of the trained user, where the image sequence feature of the trained user is a K-dimensional image sequence feature;

input the M audio features and the image sequence feature of the trained user into the third model, to calculate matching degrees between the M audio features and the image sequence feature of the trained user; and compare the calculated matching degrees between the M audio features and the image sequence feature of the trained user with the M labels, and train the initialized neural network, to obtain the target feature matching model.

According to a seventh aspect, an embodiment of the present application provides an audio matching method. The method may include:

obtaining to-be-recognized audio information and lip movement information of N users, where the to-be-recognized audio information includes an audio waveform sequence in a target time period, each of the lip movement information of the N users includes a sequence of lip movement images of a corresponding user in the target time period, and N is an integer greater than 1;

inputting the to-be-recognized audio information and the lip movement information of the N users into a target feature matching model, to obtain a matching degree between each of the lip movement information of the N users and the to-be-recognized audio information; and determining a user corresponding to the lip movement information of the user with the highest matching degree as the target user to which the to-be-recognized audio information belongs.

In a possible implementation, the target feature matching model includes a first model, a second model, and a third model; and the inputting the to-be-recognized audio information and the lip movement information of the N users into a target feature matching model, to obtain a matching degree between each of the lip movement information of the N users and the to-be-recognized audio information includes:

inputting the to-be-recognized audio information into the first model, to obtain an audio feature, where the audio feature is a K-dimensional audio feature, and K is an integer greater than 0;

inputting the lip movement information of the N users into the second model, to obtain N image sequence features, where each of the N image sequence features is a K-dimensional image sequence feature; and inputting the audio feature and the N image sequence features into the third model, to obtain a matching degree between each of the N image sequence features and the audio feature.

In a possible implementation, the target feature matching model is a feature matching model obtained through training by using lip movement information of a trained user and M pieces of audio information as inputs and by using matching degrees between the lip movement information of the trained user and the M pieces of audio information as M labels.

In a possible implementation, the method further includes:
  determining user information of the target user, where the user information includes one or more of character attribute information, facial expression information corresponding to the to-be-recognized audio information, and environment information corresponding to the to-be-recognized audio information; and
  generating, based on the user information, a control instruction that matches the user information.

In a possible implementation, the method further includes: extracting the lip movement information of the N users from video data. Further, the extracting the lip movement information of the N users from video data includes:
  recognizing N face regions in the video data based on a face recognition algorithm, and extracting a lip movement video in each of the N face regions; and
  determining the lip movement information of the N users based on the lip movement video in each face region.

In a possible implementation, the method further includes: extracting the to-be-recognized audio information from the audio data. Further, the extracting the to-be-recognized audio information from the audio data includes:
  recognizing audio data with different spectrums from the audio data based on a spectrum recognition algorithm, and recognizing audio data with a target spectrum as the to-be-recognized audio information.

According to an eighth aspect, an embodiment of the present application provides a service apparatus. The service apparatus may include a processor. The processor is configured to:
  obtain to-be-recognized audio information and lip movement information of N users, where the to-be-recognized audio information includes an audio waveform sequence in a target time period, each of the lip movement information of the N users includes a sequence of lip movement images of a corresponding user in the target time period, and N is an integer greater than 1;
  input the to-be-recognized audio information and the lip movement information of the N users into a target feature matching model, to obtain a matching degree between each of the lip movement information of the N users and the to-be-recognized audio information; and
  determine a user corresponding to the lip movement information of the user with the highest matching degree as the target user to which the to-be-recognized audio information belongs.

In a possible implementation, the target feature matching model includes a first model, a second model, and a third model; and the processor is configured to:
  input the to-be-recognized audio information into the first model, to obtain an audio feature, where the audio feature is a K-dimensional audio feature, and K is an integer greater than 0;
  input the lip movement information of the N users into the second model, to obtain N image sequence features, where each of the N image sequence features is a K-dimensional image sequence feature; and
  input the audio feature and the N image sequence features into the third model, to obtain a matching degree between each of the N image sequence features and the audio feature.

In a possible implementation, the target feature matching model is a feature matching model obtained through training by using lip movement information of a trained user and M pieces of audio information as inputs and by using matching degrees between the lip movement information of the trained user and the M pieces of audio information as M labels.

In a possible implementation, the server further includes the processor, and the processor is configured to:
  determine user information of the target user, where the user information includes one or more of character attribute information, facial expression information corresponding to the to-be-recognized audio information, and environment information corresponding to the to-be-recognized audio information; and
  generate, based on the user information, a control instruction that matches the user information.

In a possible implementation, the server further includes the processor, and the processor is further configured to:
  recognize N face regions in video data based on a face recognition algorithm, and extract a lip movement video in each of the N face regions; and
  determine the lip movement information of the N users based on the lip movement video in each face region.

In a possible implementation, the server further includes the processor, and the processor is further configured to:
  recognize audio data with different spectrums from the audio data based on a spectrum recognition algorithm, and recognize audio data with a target spectrum as the to-be-recognized audio information.

In a possible implementation, the processor is a neural network processor. Optionally, a function implemented by the processor may be cooperatively implemented by a plurality of different processors. In other words, the processor may be a combination of a plurality of processors having different functions.

According to a ninth aspect, an embodiment of this application further provides an audio matching apparatus, including a processor and a memory. The memory is configured to store a program. The processor executes the program stored in the memory. When the program stored in the memory is executed, the processor is enabled to implement any method in the first aspect or any method in the seventh aspect.

According to a tenth aspect, an embodiment of this application further provides a neural network training apparatus, including a processor and a memory. The memory is configured to store a program. The processor executes the program stored in the memory. When the program stored in the memory is executed, the processor is enabled to implement any method in the second aspect.

According to an eleventh aspect, an embodiment of this application further provides a computer-readable storage medium. The computer-readable medium is configured to store program code, and the program code includes instructions used to perform any method in the first aspect, the second aspect, or the seventh aspect.

According to a twelfth aspect, an embodiment of this application further provides a computer program product including instructions. When the computer program product runs on a computer, the computer is enabled to perform any method in the first aspect, the second aspect, or the seventh aspect.

According to a thirteenth aspect, a chip is provided. The chip includes a processor and a data interface. The processor reads, through the data interface, instructions stored in a memory, to perform any method in the first aspect, the second aspect, or the seventh aspect.

Optionally, in an implementation, the chip may further include a memory. The memory stores instructions. The processor is configured to execute the instructions stored in the memory. When the instructions are executed, the processor is configured to perform any method in the first aspect, the second aspect, or the seventh aspect.

According to a fourteenth aspect, this application provides a chip system. The chip system includes a processor. The processor is configured to support a smart device in implementing the functions in the first aspect, or configured to support an audio matching apparatus in implementing the functions in the first aspect or the seventh aspect. In a possible design, the chip system further includes a memory. The memory is configured to store a program instruction and data that are necessary for the smart device. The chip system may include a chip, or may include a chip and another discrete component.

According to a fifteenth aspect, this application provides a chip system. The chip system includes a processor, configured to support a neural network training apparatus in implementing the functions in the second aspect. In a possible design, the chip system further includes a memory. The memory is configured to store a program instruction and data that are necessary for the neural network training apparatus. The chip system may include a chip, or may include a chip and another discrete component.

According to a sixteenth aspect, an electronic device is provided. The electronic device includes any audio matching apparatus in the fifth aspect.

According to a seventeenth aspect, an electronic device is provided. The electronic device includes any neural network training apparatus in the sixth aspect.

According to an eighteenth aspect, a cloud server is provided. The cloud server includes any service apparatus in the eighth aspect.

According to a nineteenth aspect, a server is provided. The server includes any service apparatus in the eighth aspect.

BRIEF DESCRIPTION OF DRAWINGS

To describe the technical solutions in the embodiments of this application or in the background more clearly, the following describes the accompanying drawings desired for describing the embodiments of this application or the background.

DESCRIPTION OF EMBODIMENTS

Figure 1:
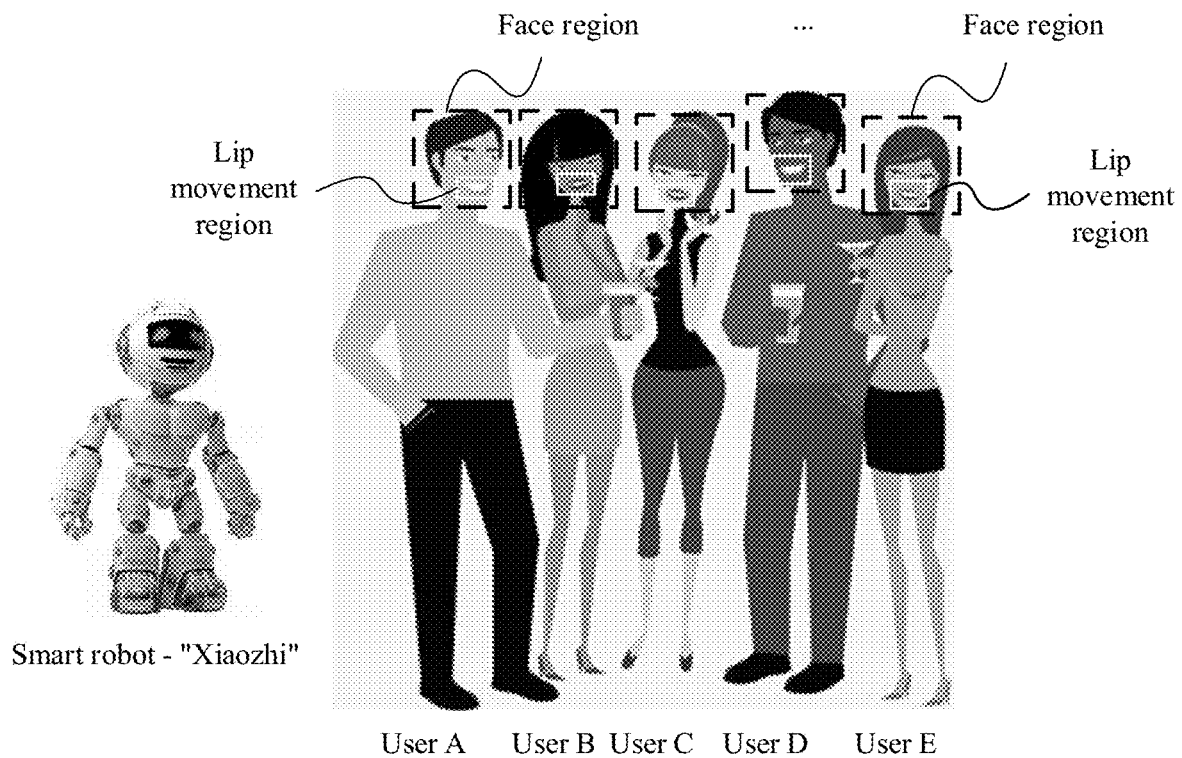
FIG. 1 is a schematic diagram of a scenario in which a robot interacts with a plurality of persons according to an embodiment of the present application.

The following describes the embodiments of the present application with reference to the accompanying drawings in the embodiments of the present application.

In the specification, claims, and the accompanying drawings of this application, the terms "first", "second", "third", "fourth" and the like are intended to distinguish between different objects but do not indicate a particular order. In addition, the terms "include", "have", or any other variant thereof, are intended to cover non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

Mentioning an "embodiment" in this specification means that a particular characteristic, structure, or feature described with reference to the embodiments may be included in at least one embodiment of this application. The phrase appear at various locations in this specification may neither necessarily mean the same embodiment, nor mean an independent or optional embodiment exclusive from another embodiment. It is explicitly and implicitly understood by persons skilled in the art that the embodiments described in this specification may be combined with another embodiment.

The terms such as "component", "module", and "system" used in this specification are used to indicate computer-related entities, hardware, firmware, combinations of hardware and software, software, or software being executed. For example, a component may be but is not limited to a process that runs on a processor, a processor, an object, an executable file, an execution thread, a program, and/or a computer. As illustrated by using figures, both a computing device and an application that runs on the computing device may be components. One or more components may reside within a process and/or an execution thread, and a component may be located on one computer and/or distributed between two or more computers. In addition, these components may be executed from various computer-readable media that store various data structures. The components may communicate by using a local and/or remote process and based on, for example, a signal having one or more data packets (for example, data from two components interacting with another component in a local system and/or a distributed system, and/or across a network such as the internet interacting with other systems by using the signal).

Some terms in this application are first described, to help persons skilled in the art have a better understanding.

(1) Bitmap: The bitmap is also referred to as a raster graphic or a dot matrix, and is an image represented by a pixel array (Pixel-array/Dot-matrix). Based on a bit depth, the bitmap may be classified as a 1-bit, 4-bit, 8-bit, 16-bit, 24-bit, or 32-bit image. When more bits of information are used by each pixel, it indicates that more colors are available, a color is presented more vivid, and correspondingly a data amount is larger. For example, a pixel bitmap with a bit depth of 1 has only two possible values (black and white), and therefore the pixel bitmap is also referred to as a binary bitmap. An image with a bit depth of 8 has $2^8$ (that is, 256) possible values. A grayscale mode image with the bit depth of 8 has 256 possible gray values. An RGB image includes three color channels. Each channel of the RGB image with 8 bits/channel has 256 possible values. This means that the image has at least 16 million possible color values. The RGB image with 8 bits/channel (bpc) is sometimes referred to as a 24-bit image (8 bits×3 channels=24 bits of data/pixel). A bitmap represented by 24 bits of combined RGB data is usually referred to as a true color bitmap.

(2) Speech recognition technology (Automatic Speech Recognition, ASR): Speech recognition is also known as automatic speech recognition, and aims to convert words in audio of a person into computer-readable inputs such as keys, binary codes, or character sequences.

(3) Voiceprint: The voiceprint is a sound wave spectrum that is displayed by an electrical acoustic instrument and that carries language information. The voiceprint is a biological feature that includes more than 100 feature dimensions such as a wavelength, a frequency, and intensity. Voiceprint recognition is a technology in which an unknown sound is recognized by analyzing one or more features of one or more audio signals. Briefly, voiceprint recognition is a technology used to recognize whether a sentence is spoken by a specific person. An identity of a speaker may be determined based on a voiceprint, and therefore a targeted answer can be provided.

(4) Mel-frequency cepstrum coefficient (MFCC): In the sound processing field, mel-frequency cepstrum is a linear transform of a logarithmic power spectrum based on a nonlinear mel scale of a sound frequency. A Mel-frequency cepstrum coefficient (MFCC) is widely applied to a speech recognition function.

(5) Multi-way cross-entropy loss: A cross-entropy loss describes the distance between two probability distributions. A lower cross-entropy loss indicates a shorter distance between the two probability distributions.

(6) Neural network:

The neural network may include neurons. The neuron may be an operation unit for which $x_s$ and an intercept of 1 are used as inputs. An output of the operation unit may be as follows:

$$h_{W,b}(x) = f(W^T x) = f(\Sigma_{s=1}^n W_s x_s + b) \quad (1\text{-}1)$$

Herein, s=1, 2, . . . , or n, n is a natural number greater than 1, $W_s$ is a weight of $x_s$, and b is bias of the neuron. f is an activation function (activation functions) of the neuron, and is used to introduce a nonlinear feature into the neural network, to convert an input signal in the neuron into an output signal. The output signal of the activation function may be used as an input of a next convolutional layer. The activation function may be a sigmoid function. The neural network is a network formed by connecting many single neurons together. To be specific, an output of a neuron may be an input of another neuron. An input of each neuron may be connected to a local receptive field of a previous layer to extract a feature of the local receptive field. The local receptive field may be a region including several neurons.

(7) Deep neural network:

The deep neural network (DNN) is also referred to as a multi-layer neural network, and may be understood as a neural network having many hidden layers. There is no special measurement criterion for the "many" herein. The DNN is divided based on locations of different layers, and a neural network in the DNN may be classified into three types: an input layer, a hidden layer, and an output layer. Usually, the first layer is the input layer, the last layer is the output layer, and all middle layers are hidden layers. Layers are fully connected. To be specific, any neuron at an $i^{th}$ layer is definitely connected to any neuron at an $(i+1)^{th}$ layer. Although the DNN looks to be quite complex, the DNN is actually not complex in terms of work at each layer, and is simply expressed as the following linear relationship expression: $\vec{y} = \alpha(W\vec{x} + b)$, where $\vec{x}$ is an input vector, $\vec{y}$ is an output vector, b is a bias vector, W is a weight matrix (also referred to as a coefficient), and $\alpha(\ )$ is an activation function. At each layer, the output vector $\vec{y}$ is obtained by performing such a simple operation on the input vector $\vec{x}$. There are many DNN layers, and therefore there are many coefficients W and bias vectors b. Definitions of these parameters in the DNN are as follows: The coefficient W is used as an example. It is assumed that in a DNN having three layers, a linear coefficient from a fourth neuron at a second layer to a second neuron at a third layer is defined as $W_{24}^3$.

The superscript 3 represents a layer at which the coefficient W is located, and the subscript corresponds to an output third-layer index 2 and an input second-layer index 4. In conclusion, a coefficient from a $k^{th}$ neuron at an $(L-1)^{th}$ layer to a $j^{th}$ neuron at an $L^{th}$ layer is defined as $W_{jk}^{L}$. It should be noted that there is no parameter W at the input layer. In the deep neural network, more hidden layers make the network more capable of describing a complex case in the real world. Theoretically, a model with more parameters indicates higher complexity and a larger "capacity", and indicates that the model can be used to complete a more complex learning task. Training the deep neural network is a process of learning a weight matrix, and a final objective of the training is to obtain a weight matrix of all layers of a trained deep neural network (a weight matrix formed by vectors W at many layers).

(8) Convolutional neural network:

The convolutional neural network (CNN) is a deep neural network with a convolutional structure. The convolutional neural network includes a feature extractor including a convolutional layer and a sub-sampling layer. The feature extractor may be considered as a filter. A convolution process may be considered as using a trainable filter to perform convolution on an input image or a convolutional feature map. The convolutional layer is a neuron layer that is in the convolutional neural network and at which convolution processing is performed on an input signal. At the convolutional layer in the convolutional neural network, one neuron may be connected to only some adjacent-layer neurons. One convolutional layer usually includes several feature maps, and each feature map may include some rectangularly-arranged neurons. Neurons in the same feature map share a weight. The shared weight herein is a convolution kernel. Weight sharing may be understood as: An image information extraction manner is unrelated to a location. A principle implied herein is that statistical information of a part of an image is the same as that of other parts. This means that image information learned for a part can also be used for other parts. Therefore, same learned image information can be used for all locations in the image. At the same convolutional layer, a plurality of convolution kernels may be used to extract different image information. Usually, a larger quantity of convolution kernels indicates richer image information reflected in a convolution operation.

The convolution kernel may be initialized in a form of a random-size matrix. In a process of training the convolutional neural network, the convolution kernel may obtain an appropriate weight through learning. In addition, direct benefits brought by weight sharing are as follows: Connections between layers of the convolutional neural network are reduced, and an overfitting risk is lowered.

(9) Loss function:

In a process of training a deep neural network, because it is expected that an output of the deep neural network maximally approximates to a value that is actually desired to be predicted, a current predicted value of the network and an actually desired target value may be compared, and then a weight vector of each layer of the neural network is updated based on a difference between the current predicted value and the target value (certainly, there is usually a process before the first update, to be specific, parameters are pre-configured for all layers in the deep neural network). For example, if the predicted value of the network is larger, the weight vector is adjusted to lower the predicted value until the deep neural network can predict the actually desired target value or a value that more approximates to the actually desired target value. Therefore, "how to obtain, through comparison, a difference between a predicted value and a target value" needs to be predefined. This is the loss function or an objective function. The loss function and the objective function are important equations used to measure the difference between the predicted value and the target value. The loss function is used as an example. A higher output value (loss) of the loss function indicates a larger difference. In this case, training of the deep neural network is a process of minimizing the loss as much as possible.

(10) Back propagation algorithm:

A convolutional neural network may refine a value of a parameter in the convolutional neural network in a training process by using an error back propagation (BP) algorithm, so that a reconstruction error loss of the convolutional neural network is increasingly smaller. Specifically, an input signal is transferred forward until an error loss is caused during output, and the parameter in the convolutional neural network is updated by using back propagation error loss information, to make the error loss converge. The back propagation algorithm is back propagation motion dominated by an error loss, and is intended to obtain a parameter, such as a weight matrix, of an optimal convolutional neural network.

(11) Pixel value:

A pixel value of an image may be a red green blue (RGB) color value, and the pixel value may be a long integer representing a color. For example, the pixel value is 256× Red+100×Green+76×Blue, where Blue represents a blue component, Green represents a green component, and Red represents a red component. For each color component, a smaller value indicates lower brightness, and a larger value indicates higher brightness. For a grayscale image, a pixel value may be a grayscale value.

First, to facilitate understanding of the embodiments of the present application, a technical problem to be specifically resolved in this application is further proposed and analyzed. In the conventional technology, there are a plurality of technical solutions to audio matching and speech recognition in a multi-person scenario. The following describes examples of two common solutions.

Solution 1

A voiceprint is a sound wave spectrum that is displayed by an electrical acoustic instrument and that carries language information. The voiceprint is a biological feature that includes more than 100 feature dimensions such as a wavelength, a frequency, and intensity. Voiceprint recognition is a technology in which an unknown sound is recognized by analyzing one or more features of one or more audio signals. Briefly, voiceprint recognition is a technology used to recognize whether a sentence is spoken by a specific person. The identity of a speaker may be determined based on a voiceprint, and therefore a targeted answer can be provided. Solution 1 mainly includes two phases: a registration phase and a verification phase. In the registration phase, a corresponding voiceprint model is established based on a voiceprint feature of the audio of a speaker. In the verification phase, the audio of the speaker is received, the voiceprint feature of the audio is extracted, and the voiceprint feature is matched with the voiceprint model established in the registration phase. If the matching succeeds, it indicates that the speaker is the originally registered speaker.

Disadvantages of Solution 1

The voiceprint recognition has some disadvantages during application. For example, the sound of the same person is easy to change, and is easily affected by his/her physical condition, age, emotion, and the like. For example, different microphones and channels exert impact on recognition performance. For example, an environmental noise interferes with the recognition. For another example, when a plurality of speakers simultaneously talk, it is difficult to extract a voiceprint feature of a person.

Solution 2

A sound source localization technology is a technology in which acoustics and electronic apparatuses are used to receive target sound field information to determine a location of a target sound source. During sound source localization by a microphone array, the microphone array is used to pick up sound source signals, analyze and process a plurality of channels of sound signals, and extract one or more sound source planes or spatial coordinates in a space domain, namely, obtain the location of the sound source. Further, a beam of the microphone array is controlled to aim at a speaker.

Disadvantages of Solution 2

(1) That movement of a robot leads to movement of the microphone array is a main difference between a sound source localization technology for robot audition and a conventional sound source localization technology. The microphone array in movement encounters an acoustic environment that changes in real time, and therefore it is required that a sound source localization system has high real-time performance. Currently, most sound source localization systems have a large quantity of sensors. Consequently, computational complexity of an algorithm is relatively high, and a smaller quantity of microphones and a localization algorithm with lower complexity need to be further explored.

(2) Almost all practical sound source localization systems inevitably encounter a complex acoustic environment in which there are various types of noises and reverberations. When a robot operates in a real environment, the robot inevitably encounters signal reverberations and noises. In this case, an anti-reverberation and anti-noise capability of a sound source localization system greatly affect localization performance. Most existing anti-noise technologies are appropriate for only one or several types of noises, and a robust anti-noise technology or solution appropriate for various types of noises needs to be further studied.

In conclusion, if the foregoing two solutions are applied to audio matching and speech recognition in the multi-person scenario, a specific user that sends the current audio content cannot be accurately recognized. Consequently, more accurate and effective human-computer interaction cannot be implemented. A technical problem to be addressed in this application is how to accurately distinguish between different speakers and perform targeted personalized interaction when a robot or another smart device interacts with a plurality of users face to face (multi-person teaching, a game, family daily life, and the like).

An audio matching method provided in the embodiments of this application can be applied to human-computer interaction scenarios for smart devices such as a smart robot, a smart speaker, a smart wearable device, and a smartphone. The following describes examples of human-computer interaction scenarios to which the audio matching method in this application is applied, and the following three scenarios may be included.

In Scenario 1, a robot is used to implement human-computer interaction.

FIG. 1 is a schematic diagram of a scenario in which a robot interacts with a plurality of persons according to an embodiment of the present application. The application scenario includes a smart robot and a plurality of users (FIG. 1 shows an example in which a group of friends, a user A, a user B, a user C, a user D, and a user E, participate in a party). Assuming that the user C in the group of friends wants to ask the smart robot to bring a glass of juice, the user C sends an audio request "Xiaozhi, please bring me a glass of juice, thank you". In this case, the smart robot Xiaozhi first needs to collect audio data and video data in the current party scenario, where the audio data includes the audio request "Xiaozhi, please bring me a glass of juice, thank you" sent by the user C, and the video data includes lip movement information of all the users in the same time period in which the audio request is sent. The smart robot Xiaozhi performs processing and analysis based on the to-be-recognized audio information and the lip movement information of the plurality of users, to determine, from the user A, the user B, the user C, the user D, and the user E, a user who specifically sends the audio request. Further, the smart robot "Xiaozhi" controls, based on the determined result, the smart robot to send, to the user C, the specified juice or a glass of juice selected through determining.

In Scenario 2, a smart speaker is used to implement human-computer interaction.

Figure 2:
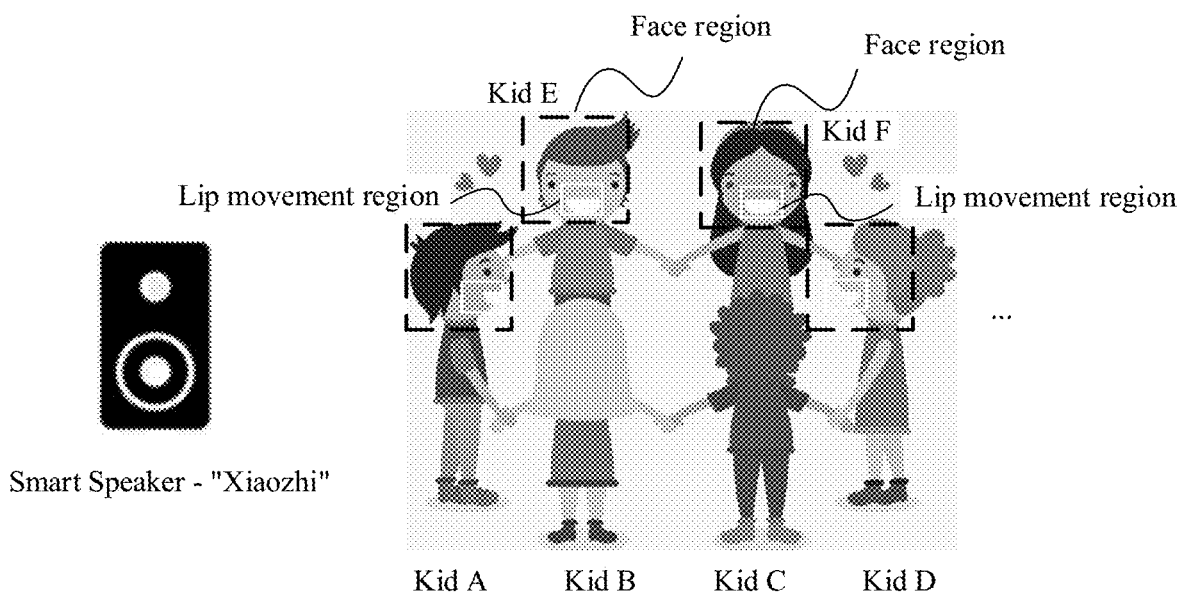
FIG. 2 is a schematic diagram of a scenario in which a smart speaker interacts with a plurality of persons according to an embodiment of the present application.

FIG. 2 is a schematic diagram of a scenario in which a smart speaker interacts with a plurality of persons according to an embodiment of the present application. The application scenario includes a smart speaker and a plurality of users (FIG. 1 shows an example in which a group of kids, a kid A, a kid B, a kid C, a kid D, a kid E, and a kid F, play games on a playground). Assuming that the kid B wants to ask the smart speaker to order a favorite song to liven up the atmosphere, the kid B sends an audio request "Xiaozhi, please play the song 'Xiao Tai Yang' that I have heard last time". Because there may be many songs named "Xiao Tai Yang", and different kids may have heard different versions, the smart speaker needs to further determine a specific version of a song that needs to be played currently. In this case, the smart speaker Xiaozhi first needs to collect audio data and video data in the current game scenario, where the audio data includes the audio request "Xiaozhi, please play the song 'Xiao Tai Yang' that I have heard last time" sent by the kid B, and the video data includes lip movement information of all the kids in the same time period in which the audio request is sent; and the smart speaker Xiaozhi performs processing and analysis based on the to-be-recognized audio information and the lip movement information of the plurality of kids, to determine, from the kid A, the kid B, the kid C, the kid D, the kid E, and the kid F, a kid who sends the audio request. Further, the smart speaker "Xiaozhi" searches a playback record of the kid B for a song "Xiao Tai Yang" based on the determined result, and controls the smart speaker to play the song "Xiao Tai Yang".

In Scenario 3, a smartphone/smartwatch is used to implement human-computer interaction.

Figure 3:
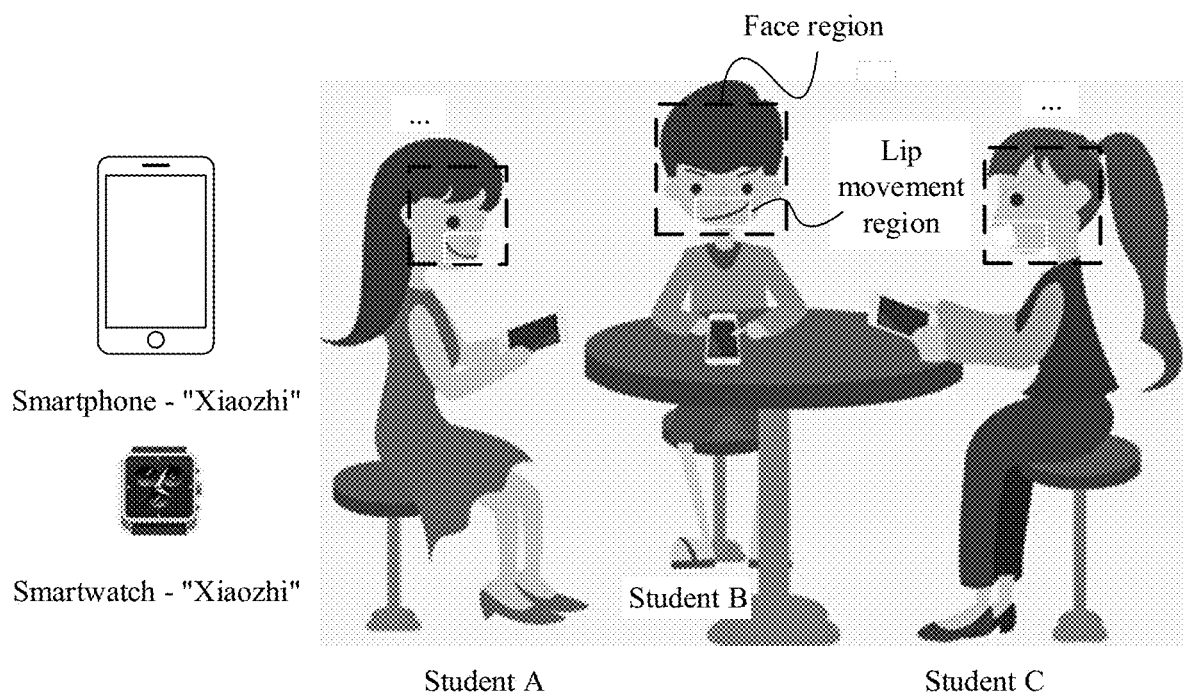
FIG. 3 is a schematic diagram of a scenario in which a smartphone/smartwatch interacts with a plurality of persons according to an embodiment of the present application.

FIG. 3 is a schematic diagram of a scenario in which a smartphone/smartwatch interacts with a plurality of persons according to an embodiment of the present application. The application scenario includes a smartphone/smartwatch and a plurality of users (FIG. 1 shows an example in which a group of students, a student A, a student B, and a student C, order meals together). Assuming that the students A, B, and C want to order meals in an audio manner by using a smartphone or smartwatch, the students A, B, and C may order meals by using the smartphone or smartwatch of the student B (there may be a discount for ordering meals together, and it is convenient to place the order). However, three persons need to send audio instructions for meal ordering to the smartphone or smartwatch of the student B. For example, the student B says to the smartphone, "Xiaozhi, I want to order the sweet and sour pork ribs from the restaurant XX", the student A says to the smartphone of the student B: "Xiaozhi, I want to order the boiled fish with Sichuan pickles from the restaurant XXXX", and the student C says to the smartphone of the student B: "Xiaozhi, I want to order the soup with pepper and the seaweed rice rolls from the restaurant XXX". After the smartphone places the order, the smartphone may encounter a problem of splitting a fee for the three students. In this case, the smartphone first needs to collect audio data and video data in a current table-sharing dining scenario, where the audio data includes the audio instructions for meal ordering respectively sent by the student A, the student B, and the student C, and the video data includes lip movement information of all the three students in the same time period in which the audio instructions are sent by the three students. The smartphone performs processing and analysis based on the to-be-recognized audio information (three instructions for meal ordering) and the lip movement information of the three students, to determine the corresponding students that respectively send the three audio instructions for meal ordering, and calculates a meal fee for each student after the discount based on the determining. In addition, the smartphone may separately initiate a corresponding request for meal fee payment to the students A and C by using a corresponding client on the smartphone. In this way, the smartphone implements a function of ordering meals by the plurality of persons through audio and a charging function.

It may be understood that the application scenarios in FIG. 1, FIG. 2, and FIG. 3 are merely several example implementations in the embodiments of the present application, and application scenarios in the embodiments of the present application include but are not limited to the foregoing application scenarios. The audio matching method in this application may be further applied to a scenario in which an intelligent computer interacts with a plurality of persons in a meeting, an intelligent computer interacts with a plurality of persons in a game, or a smart caravan interacts with a plurality of persons, and the like. Other scenarios and examples are not listed and described one by one.

The following describes the method provided in this application from a model training side and a model application side.

Any neural network training method provided in this application relates to computer auditory and visual fusion processing, and may be applied to data processing methods such as data training, machine learning, and deep learning methods, to perform symbolic and formal intelligent information modeling, extraction, pre-processing, training, and the like on training data (for example, lip movement information of a trained user and M pieces of audio information in this application), to finally obtain a trained target feature matching model. In addition, in any audio matching method provided in this application, the trained target feature matching model may be used. To be specific, input data (for example, to-be-recognized audio information and lip movement information of N users in this application) may be input into the trained target feature matching model, to obtain output data (for example, a matching degree between each of the lip movement information of the N users and the to-be-recognized audio information in this application). It should be noted that a neural network training method and an audio matching method that are provided in the embodiments of this application are applications generated based on the same concept, and may also be understood as two parts of a system or two phases of an entire process, for example, a model training phase and a model application phase.

Figure 4:
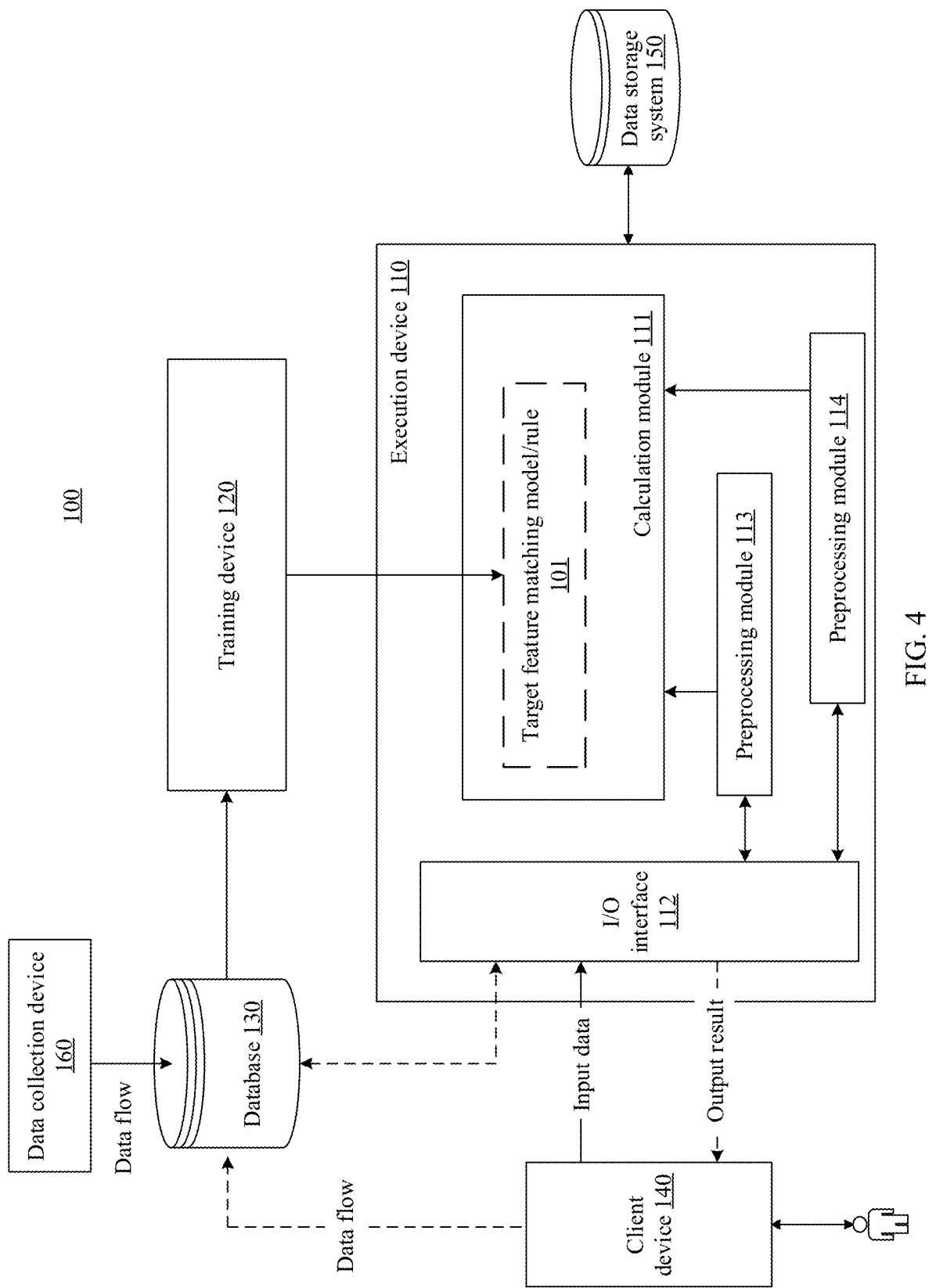
FIG. 4 shows a system architecture 100 according to an embodiment of the present application.

FIG. 4 shows a system architecture 100 according to an embodiment of the present application. As shown in the system architecture 100, a data collection device 160 is configured to collect training data. In this application, the data collection device 160 may include a microphone and a camera. In this embodiment of the present application, the training data (that is, input data on a model training side) may include video sample data and audio sample data that are respectively lip movement information of a trained user and M pieces of audio information. The M pieces of audio information may include audio information that matches the lip movement information of the trained user. For example, the video sample data is a sequence of lip movement images when a trained user sends audio: "It's a very nice day today. Where shall we go for an outing?", and the audio sample data includes an audio waveform sequence (used as a positive audio sample) of the audio "It's a very nice day today. Where shall we go for an outing?" sent by the trained user and (M−1) other audio waveform sequences (used as a negative audio sample). The video sample data and the audio sample data may be collected by the data collection device 160, or may be downloaded from a cloud. FIG. 1 merely shows an example architecture, and does not constitute a limitation. Further, the data collection device 160 stores the training data into a database 130. A training device 120 obtains a target feature matching model/rule 101 through training based on the training data maintained in the database 130 (the target feature matching model 101 herein is the target feature matching model in the embodiments of the present application; for example, the target feature matching model 101 is a model obtained through training in the foregoing training phase, and a neural network model that may be used for feature matching between audio and a lip movement trajectory).

The following describes in more detail how the training device 120 obtains the target feature matching model/rule 101 based on the training data. The target feature matching model/rule 101 can be used to implement any audio matching method provided in the embodiments of the present application. To be specific, related preprocessing is performed on the audio data and the video data that are obtained by the data collection device 160 and then input into the target feature matching model/rule 101, to obtain a matching degree/confidence level between each of lip movement image sequence features of a plurality of users and a to-be-recognized audio feature. The target feature matching model/rule 101 in an embodiment of the present application may be a spatio-temporal convolutional network (STCNN). In this embodiment provided in this application, the spatio-temporal convolutional network may be obtained by training a convolutional neural network. It should be noted that, in actual application, the training data maintained in the database 130 is not all collected by the data collection device 160, and may be received from another device. In addition, it should be noted that the training device 120 does not necessarily perform training completely based on the training data maintained in the database 130 to obtain the target feature matching model/rule 101, and may obtain training data from a cloud or another place for model training. The foregoing description shall not be construed as a limitation on this embodiment of the present application.

As shown in FIG. 1, the target feature matching model/rule 101 is obtained through training by the training device 120. The target feature matching model/rule 101 may be referred to as an audio-visual cross convolutional neural network (V&A Cross CNN)/a spatio-temporal convolutional neural network in this embodiment of the present application. Specifically, the target feature matching model provided in this embodiment of the present application may include a first model, a second model, and a third model. The first model is used to extract an audio feature, the second model is used to extract lip movement image sequence features of a plurality of users (N users in this application), and the third model is used to calculate matching degrees/confidence levels between the audio feature and the image sequence features of the N users. In the target feature matching model provided in this embodiment of the present application, the first model, the second model, and the third model each may be a convolutional neural network. In other words, it may be understood that the target feature matching model/rule 101 may be considered as an entire spatio-temporal convolutional neural network, and the spatio-temporal convolutional neural network further includes a plurality of independent networks, for example, the first model, the second model, and the third model.

The target feature matching model/rule 101 obtained through training by the training device 120 may be applied to different systems or devices, for example, applied to an execution device 110 shown in FIG. 1. The execution device 110 may be a terminal such as a mobile phone, a tablet computer, a notebook computer, an augmented reality (AR)/virtual reality (VR) device, a smart wearable device, a smart robot, or an in-vehicle terminal, or may be a server, a cloud, or the like. In FIG. 1, an I/O interface 112 is configured for the execution device 110, and is configured to exchange data with an external device. A user may input data into the I/O interface 112 by using a client device 140 (the client device in this application may also include a data collection device such as a microphone and a camera). In an embodiment of the present application, the input data (namely, data input on a model application side) may include to-be-recognized audio information and lip movement information of N users. In an embodiment of the present application, the to-be-recognized audio information includes an audio waveform sequence in a target time period, and each of the lip movement information of the N users includes a sequence of lip movement images of a corresponding user in the target time period. For example, currently, when a specific person who sends audio information of "What's the weather like tomorrow? Where is suitable for an outing?" needs to be recognized from a plurality of persons, an audio waveform sequence corresponding to "What's the weather like tomorrow? Where is suitable for an outing?" and sequences of lip movement images corresponding to all the persons are used as input data. It may be understood that the input data herein may be input by a user, or may be provided by a related database, and varies according to a specific application scenario. This is not specifically limited in this embodiment of the present application.

In an embodiment of the present application, the client device 140 and the execution device 110 may be located on the same device; and the data collection device 160, the database 130, and the training device 120 may also be located on the same device as the execution device 110 and the client device 140. For example, an execution body in this application is a robot. After the robot obtains, through extraction, the to-be-recognized audio information and the lip movement information of the N users from the collected audio data and video data by using a client device 140 (including a microphone, a camera, and a processor), an execution device 110 in the robot may further perform feature matching between the extracted audio information and the lip movement information, and finally output a result to the client device 140. The processor in the client device 140 obtains, through analysis, a target user that is in the N users and to which the to-be-recognized audio information belongs. In addition, devices (a data collection device 160, a database 130, and a training device 120) on a model training side may be located in the robot or on a cloud. When the devices are located in the robot, it may be considered that the robot has a model training function or a model update and optimization function. In this case, the robot not only has a function of the model training side, but also has a function of the model application side. When the devices are located on the cloud, the robot has only the function of the model application side. Optionally, the client device 140 and the execution device 110 may alternatively be not located on the same device. To be specific, collection of the audio data and the video data and extraction of the to-be-recognized audio information and the lip movement information of the N users may be performed by the client device 140 (for example, a smartphone or a smart robot), and a process of performing feature matching between the to-be-recognized audio information and the lip movement information of the N users may be performed by the execution device 110 (for example, a cloud server or a server). Alternatively, collection of the audio data and the video data is performed by the client device 140, and extraction of the to-be-recognized audio information and the lip movement information of the N users, and a process of performing feature matching between the to-be-recognized audio information and the lip movement information of the N users are performed by the execution device 110.

In a case shown in FIG. 1, a user may manually provide the input data. The manual provision may be performed in an interface provided by the I/O interface 112. In another case, the client device 140 may automatically send the input data to the I/O interface 112. If the client device 140 is required to automatically send the input data, the client device 140 needs to obtain authorization from a user, and the user may set corresponding permission on the client device 140. The user may view, on the client device 140, a result output by the execution device 110. Specifically, the result may be displayed or may be presented in the form of a sound, an action, or the like. The client device 140 may also be used as a data collection end (for example, a microphone or a camera), to collect the input data that is to be input into the I/O interface 112 and an output result that is to be output from the I/O interface 112, as shown in the figure, use the input data and the output result as new sample data, and store the new sample data into the database 130. Certainly, the client device 140 may alternatively not perform collection, and the I/O interface 112 directly stores, into the database 130 as new sample data, the input data that is input into the I/O interface 112 and an output result that is output from the I/O interface 112, as shown in the figure.

A preprocessing module 113 is configured to perform preprocessing based on the input data (for example, the audio data) received through the I/O interface 112. In an embodiment of the present application, the preprocessing module 113 may be configured to preprocess the audio data, for example, extract the to-be-recognized audio information from the audio data.

A preprocessing module 114 is configured to perform preprocessing based on the input data (for example, the video data) received through the I/O interface 112. In an embodiment of the present application, the preprocessing module 114 may be configured to preprocess the video data, for example, extract, from the video data, the lip movement information of the N users corresponding to the to-be-recognized audio information.

In a related processing procedure in which the execution device 110 preprocesses the input data or a calculation module 111 of the execution device 110 performs calculation, the execution device 110 may invoke data, code, and the like in a data storage system 150 for corresponding processing, and may further store data, instructions, and the like obtained through corresponding processing into the data storage system 150. Finally, the I/O interface 112 returns, to the client device 140, an output result such as a matching degree between each of the lip movement information of the N users and the to-be-recognized audio information or a target user ID corresponding to the highest matching degree in an embodiment of the present application; and the client device 140 determines user information of the target user based on the matching degree, and generates, based on the user information, a control instruction that matches the user information.

It should be noted that the training device 120 may generate corresponding target feature matching models/rules 101 for different objectives or different tasks based on different training data. The corresponding target feature matching models/rules 101 may be used to achieve the objectives or complete the tasks. In this way, desired results are provided for users.

It should be noted that FIG. 1 is merely a schematic diagram of the system architecture provided in this embodiment of the present application. The locational relationship between the devices, the components, the modules, and the like shown in the figure does not constitute any limitation. For example, in FIG. 1, the data storage system 150 is an external memory relative to the execution device 110. However, in another case, the data storage system 150 may alternatively be disposed in the execution device 110.

Based on the description of the system architecture, the following describes a neural network model, namely, a convolutional neural network, on a model training side and a model application side in the embodiments of the present application. The convolutional neural network CNN is a deep neural network with a convolutional structure, and is a deep learning architecture. The deep learning architecture performs a plurality of levels of learning at different abstract layers by using a machine learning algorithm. As the deep learning architecture, the CNN is a feed-forward artificial neural network. Neurons in the feed-forward artificial neural network respond to an overlapping region in images input into the CNN.

Figure 5:
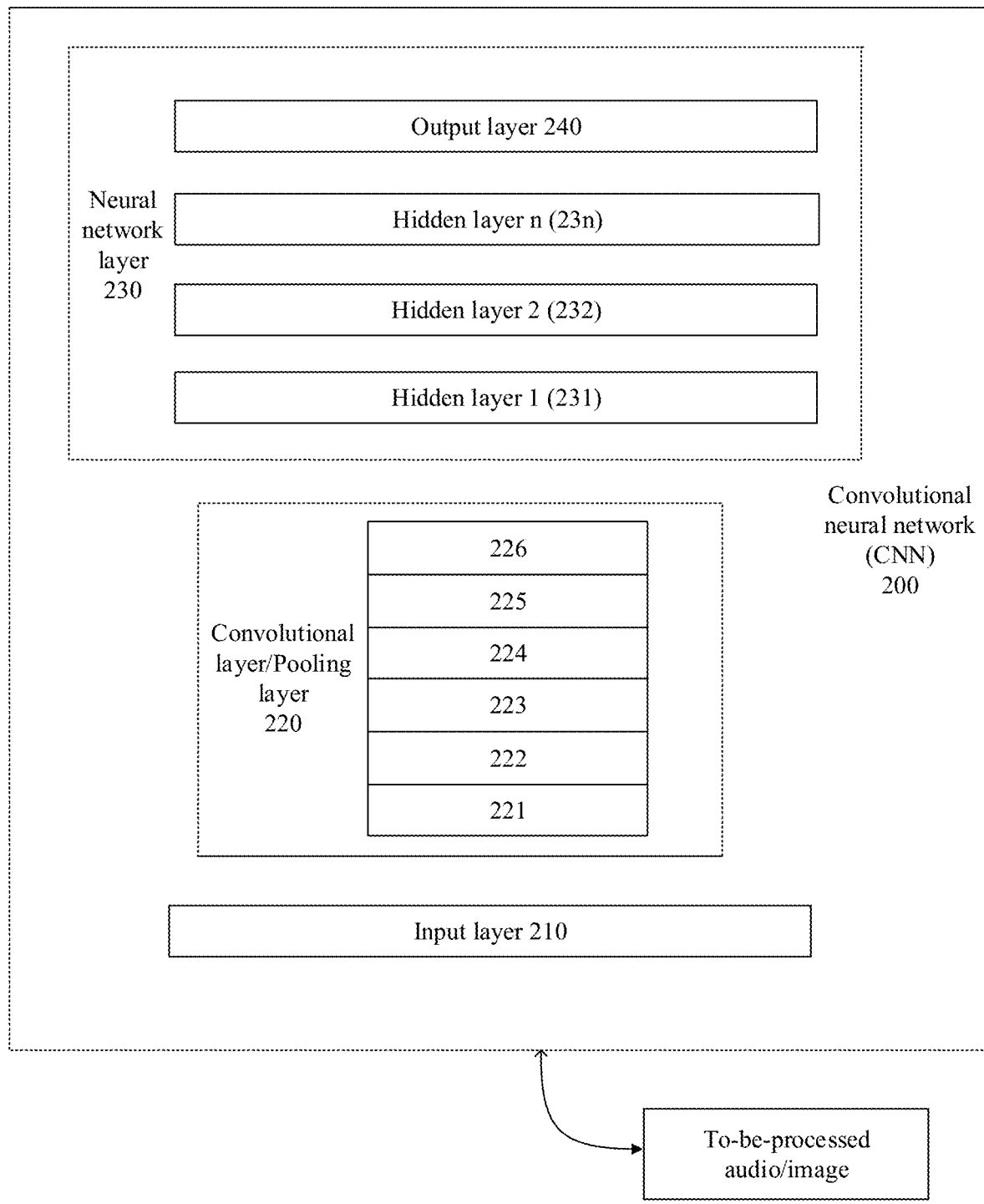
FIG. 5 is a schematic diagram of a convolutional neural network according to an embodiment of the present application.

As shown in FIG. 5, FIG. 5 is a schematic diagram of a convolutional neural network according to an embodiment of the present application. The convolutional neural network (CNN) 200 may include an input layer 210, a convolutional layer/pooling layer 220, and a neural network layer 230. The pooling layer is optional.

Convolutional Layer/Pooling Layer 220

As shown in FIG. 1, the convolutional layer/pooling layer 120 may include layers 221 to 226. In an implementation, the layer 221 is a convolutional layer, the layer 222 is a pooling layer, the layer 223 is a convolutional layer, the layer 224 is a pooling layer, the layer 225 is a convolutional layer, and the layer 226 is a pooling layer. In another implementation, the layers 221 and 222 are convolutional layers, the layer 223 is a pooling layer, the layers 224 and 225 are convolutional layers, and the layer 226 is a pooling layer. To be specific, an output of a convolutional layer may be used as an input of a subsequent pooling layer, or may be used as an input of another convolutional layer for continuing to perform a convolution operation.

Convolutional Layer

The convolutional layer 221 is used as an example. The convolutional layer 221 may include a plurality of convolution operators. The convolution operator is also referred to as a kernel. In image processing, the convolution operator functions as a filter that extracts specific information from an input image matrix. The convolution operator may essentially be a weight matrix, and the weight matrix is usually predefined. In a process of performing a convolution operation on an image, the weight matrix is usually used to process pixels at a granularity level of one pixel (or two pixels, depending on the value of the stride) in the horizontal direction on an input image, to extract a specific feature from the image. A size of the weight matrix should be related to a size of the image. It should be noted that the depth dimension of the weight matrix is the same as the depth dimension of the input image. During a convolution operation, the weight matrix extends to an entire depth of the input image. Therefore, a convolutional output of a single depth dimension is generated through convolution with a single weight matrix. However, in most cases, a single weight matrix is not used, but a plurality of weight matrices with the same dimension are applied. Outputs of the weight matrices are stacked to form the depth dimension of a convolutional image. Different weight matrices may be used to extract different features from the image. For example, one weight matrix is used to extract edge information of the image, another weight matrix is used to extract a specific color of the image, still another weight matrix is used to blur unnecessary noises in the image, and so on. Because the plurality of weight matrices have the same dimension, feature maps extracted by using the plurality of weight matrices also have the same dimension. Then, the plurality of extracted feature maps with the same dimension are combined to form an output of the convolution operation.

In actual application, a lot of training needs to be performed to obtain weight values in these weight matrices. The weight matrices formed by using the weight values obtained through training may be used to extract information from the input image, to help the convolutional neural network 200 to perform correct prediction.

When the convolutional neural network 200 includes a plurality of convolutional layers, a relatively large quantity of general features are usually extracted at an initial convolutional layer (for example, 221). The general feature may also be referred to as a low-level feature. As the depth of the convolutional neural network 200 increases, a feature, for example, a high-level semantic feature, extracted at a subsequent convolutional layer (for example, 226) becomes more complex. A feature with higher-level semantics is more appropriate for a to-be-resolved problem.

Pooling Layer

The quantity of training parameters often needs to be reduced. Therefore, a pooling layer often needs to be periodically introduced after a convolutional layer. For example, for the layers 221 to 226 shown in 220 in FIG. 1, one convolutional layer may be followed by one pooling layer, or a plurality of convolutional layers may be followed by one or more pooling layers. During image processing, the pooling layer is only used to reduce a space size of an image. The pooling layer may include an average pooling operator and/or a maximum pooling operator, to perform sampling on an input image to obtain an image with a relatively small size. The average pooling operator may be used to calculate pixel values of an image in a specific range, to generate an average value. The maximum pooling operator may be used to select a pixel with a maximum value in a specific range as a maximum pooling result. In addition, similar to a case in which a size of a weight matrix at the convolutional layer needs to be related to a size of the image, an operator at the pooling layer also needs to be related to the size of the image. A size of a processed image output from the pooling layer may be less than a size of an image input into the pooling layer. Each pixel in the image output from the pooling layer represents an average value or a maximum value of a corresponding sub-region of the image input into the pooling layer.

Neural Network Layer 130

After processing performed at the convolutional layer/pooling layer 220, the convolutional neural network 100 is not ready to output desired output information. As described above, at the convolutional layer/pooling layer 220, only a feature is extracted, and parameters resulting from an input image are reduced. However, to generate final output information (desired class information or other related information), the convolutional neural network 200 needs to use the neural network layer 230 to generate an output of one desired class or outputs of a group of desired classes. Therefore, the neural network layer 230 may include a plurality of hidden layers (231, 232, . . . , and 23n shown in FIG. 1) and an output layer 240. Parameters included in the plurality of hidden layers may be obtained through pre-training based on related training data of a specific task type. For example, the task types may include image recognition, image categorization, and super-resolution image reconstruction.

At the neural network layer 230, the plurality of hidden layers are followed by the output layer 240, namely, the last layer of the entire convolutional neural network 200. The output layer 240 has a loss function similar to a categorical cross-entropy loss, and the loss function is used to calculate a prediction error. Once forward propagation (propagation in the direction from 210 to 240 shown in FIG. 1) of the entire convolutional neural network 200 is completed, back propagation (propagation in the direction from 240 to 210 shown in FIG. 1) is started to update a weight value and a deviation of each layer mentioned above, to reduce a loss of the convolutional neural network 200 and an error between a result output by the convolutional neural network 200 through the output layer and an ideal result.

It should be noted that the convolutional neural network 200 shown in FIG. 5 is merely used as an example of a convolutional neural network. In specific application, the convolutional neural network may alternatively exist in a form of another network model, for example, a plurality of parallel convolutional layers/pooling layers, and extracted features are all input into the entire neural network layer 230 for processing.

A normalization layer in this application is used as a function layer of the CNN. In principle, the normalization layer may be implemented after or before any one of the foregoing layers of the CNN. A feature matrix output from a previous layer is used as an input of the normalization layer, and an output of the normalization layer may also be used as an input of any function layer of the CNN. However, in actual application of the CNN, the normalization layer is usually implemented after a convolutional layer. A feature matrix output from the convolutional layer is used as an input matrix.

Figure 6:
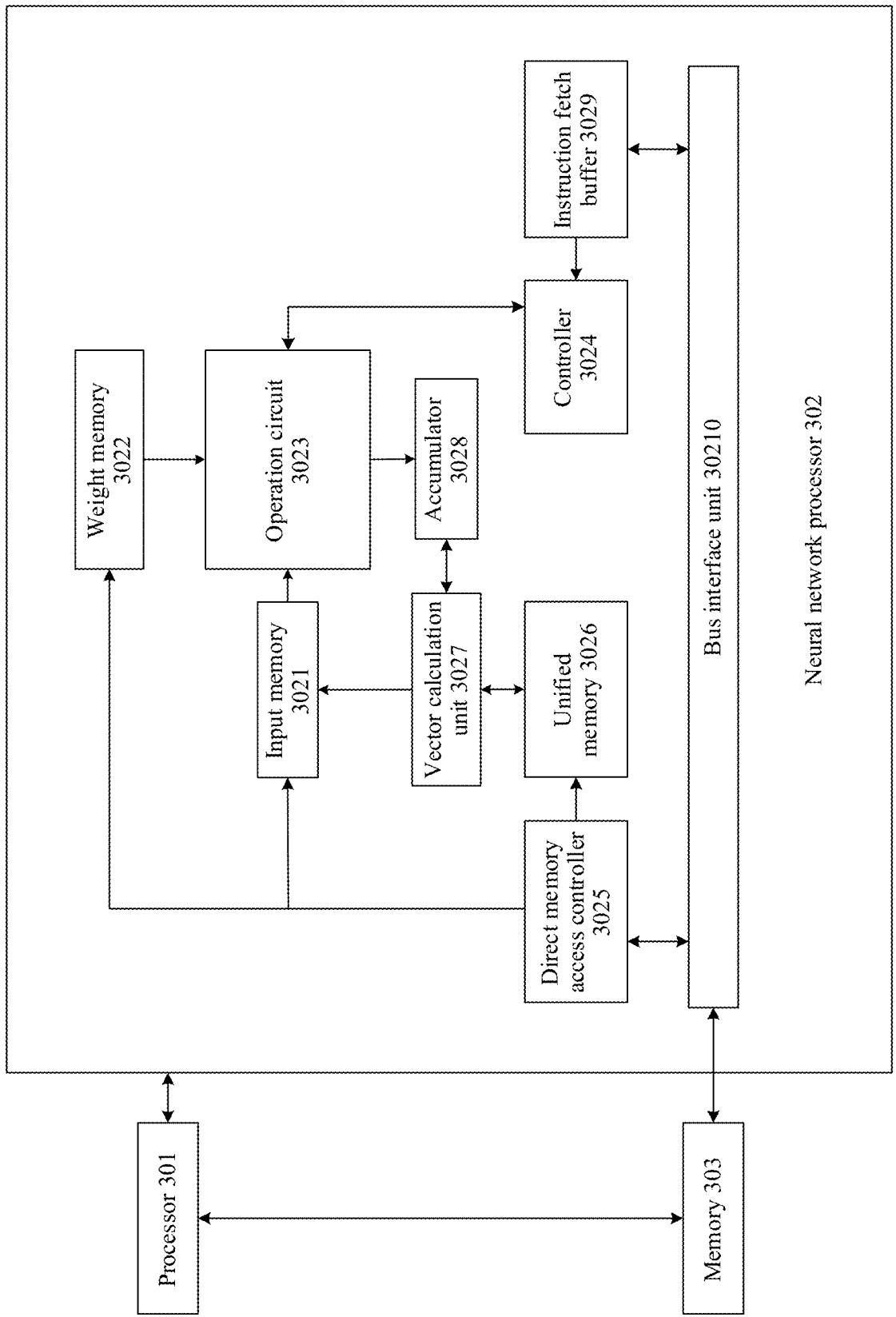
FIG. 6 is a diagram of a hardware structure of a neural network processor according to an embodiment of the present application.

On a basis of the descriptions of the related functions of the system architecture 100 in FIG. 4 and the convolutional neural network 200 in FIG. 5, FIG. 6 is a diagram of a hardware structure of a neural network processor according to an embodiment of the present application.

A neural network processor NPU 302 is mounted to a CPU 301 (for example, a host CPU) as a coprocessor, and the host CPU 301 allocates a task. For example, corresponding to the system architecture 100, in this application, the CPU 301 may be located in the client device 140, and is configured to extract to-be-recognized audio information and lip movement information of N users from audio data and video data; and the NPU 302 may be located in the calculation module 111, and is configured to perform feature extraction and feature matching on the to-be-recognized audio information and the lip movement information of the N users that are extracted by the CPU 301, to send a matching result to the CPU 301 for further calculation. Details are not described herein. It may be understood that the CPU and the NPU may be located in different devices, and may be disposed in a different manner based on an actual requirement of a product. For example, the NPU is located on a cloud server, and the CPU is located on user equipment (such as a smartphone or a smart robot). Alternatively, both the CPU and the NPU are located on a client device (such as a smartphone or a smart robot).

A core part of the NPU 302 is an operation circuit 3023. The operation circuit 3023 is controlled by a controller 3024 to extract matrix data in a memory and perform a multiplication operation.

In some implementations, the operation circuit 3023 includes a plurality of process engines (PE). In some implementations, the operation circuit 3023 is a two-dimensional systolic array. The operation circuit 3023 may alternatively be a one-dimensional systolic array or another electronic circuit that can perform mathematical operations such as multiplication and addition. In some implementations, the operation circuit 3023 is a general-purpose matrix processor.

For example, it is assumed that there are an input matrix A, a weight matrix B, and an output matrix C. The operation circuit fetches data corresponding to the matrix B from a weight memory 3022, and buffers the data on each PE of the operation circuit. The operation circuit fetches data of the matrix A from an input memory 3021, to perform a matrix operation on the data of the matrix A and the matrix B, obtains a partial result or a final result of a matrix, and stores the result in an accumulator 3028.

A unified memory 3026 is configured to store input data and output data. Weight data is directly transferred to the weight memory 3022 by using a direct memory access controller (DMAC) 30212. The input data is also transferred to the unified memory 3026 by using the DMAC.

A BIU is a bus interface unit, namely, a bus interface unit 1210, and is used for interaction between an AXI bus and the DMAC and between the AXI bus and an instruction fetch buffer 3029.

The bus interface unit (BIU) 1210 is used by the instruction fetch buffer 3029 to obtain an instruction from an external memory, and is further used by the direct memory access controller 30212 to obtain original data of the input matrix A or the weight matrix B from the external memory.

The DMAC is mainly configured to transfer the input data in the external memory DDR to the unified memory 3026, transfer the weight data to the weight memory 3022, or transfer the input data to the input memory 3021.

A vector calculation unit 3027 includes a plurality of operation processing units, and if necessary, performs further processing such as vector multiplication, vector addition, an exponential operation, a logarithmic operation, or value comparison on outputs of the operation circuit. The vector calculation unit 3027 is mainly configured to perform network calculation at a non-convolutional/FC layer in a neural network, for example, pooling, batch normalization, or local response normalization.

In some implementations, the vector calculation unit 3027 can store a processed output vector into a unified buffer 3026. For example, the vector calculation unit 3027 may apply a non-linear function to the outputs of the operation circuit 3023. For example, the non-linear function is applied to a vector of an accumulated value to generate an activation value. In some implementations, the vector calculation unit 3027 generates a normalized value, a combined value, or both the normalized value and the combined value. In some implementations, the processed output vector can be used as an activation input to the operation circuit 3023, for example, used at a subsequent layer in the neural network.

The instruction fetch buffer 3029 connected to the controller 3024 is configured to store instructions used by the controller 3024.

The unified memory 3026, the input memory 3021, the weight memory 3022, and the instruction fetch buffer 3029 are all on-chip memories. The external memory is private to the hardware architecture of the NPU.

It may be understood that, related functions such as feature extraction of and feature matching between to-be-recognized audio information and lip movement information of N users in any audio matching method embodiment of this application and feature extraction of and feature matching between lip movement information of a trained user and M pieces of audio information in any neural network training method embodiment in this application may be implemented by related functional units in the neural network processor (NPU) 302, or may be jointly implemented by the processor 301 and the neural network processor 302. Details are not described herein.

With reference to the foregoing application scenarios, the system architecture, the structure of the convolutional neural network, and the structure of the neural network processor, the following describes, from a model training side and a model application side, a neural network training method embodiment and an audio matching method embodiment that are provided in this application, and analyzes and resolves the technical problems described in this application.

Figure 7A:
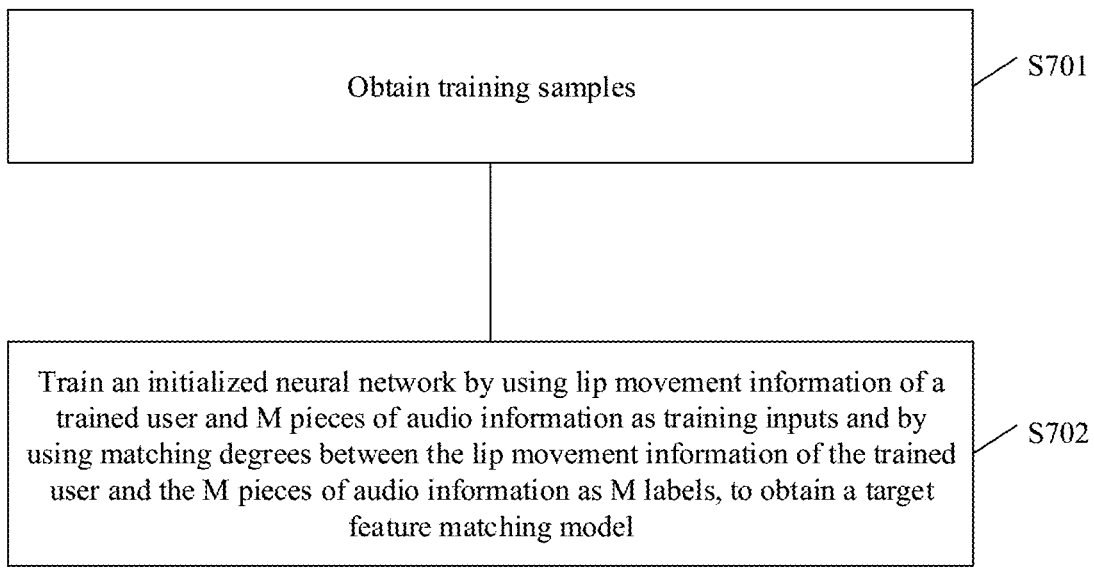
FIG. 7A is a schematic flowchart of a neural network training method according to an embodiment of the present application.

FIG. 7A is a schematic flowchart of a neural network training method according to an embodiment of the present application. The method may be applied to the application scenario in FIG. 1, FIG. 2, or FIG. 3 and the foregoing system architecture, and may be applied to the training device 120 in FIG. 4. The following provides descriptions with reference to FIG. 7A by using an example in which an execution body is the training device 120 in FIG. 4 or a device including the training device 120. The method may include the following steps S701 and S702.

S701: Obtain training samples, where the training samples include lip movement information of a trained user and M pieces of audio information.

Specifically, for example, the lip movement information of the trained user is audio information sent by a user Xiaofang: "Hello, my name is Xiaofang. I'm from Hunan, China. How about you?" Corresponding lip movement information is a lip movement video or a sequence of consecutive lip movement images. Therefore, the M pieces of audio information include the audio information "Hello, my name is Xiaofang. I'm from Hunan, China. How about you?" that is used as a positive audio sample and other audio information such as "Hello, have you had supper?", "It's a very nice day today. Where have you been?", and "Help me find a travel route from Hunan to Beijing?" that are used as negative samples. Optionally, the M pieces of audio information include audio information that matches the lip movement information of the trained user and (M−1) pieces of audio information that do not match the lip movement information of the trained user. Further, optionally, the lip movement information of the trained user includes a sequence of lip movement images of the trained user, and the M pieces of audio information include one audio waveform sequence that matches the sequence of lip movement images of the trained user and (M−1) audio waveform sequences that do not match the sequence of lip movement images of the trained user. For example, the lip movement information is a sequence of consecutive lip movement images (namely, a video of mouth shapes) corresponding to the audio information sent by the user Xiaofang: "Hello, my name is Xiaofang. I'm from Hunan, China. How about you?", and the M pieces of audio information include the audio waveform sequence corresponding to the positive audio sample and (M−1) audio waveform sequences corresponding to the negative samples. It may be understood that the M pieces of audio information may alternatively include a plurality of positive samples and a plurality of negative samples. In other words, the quantity of positive samples and the quantity of negative samples are not specifically limited, provided that both positive samples and negative samples are included.

Figure 7B:
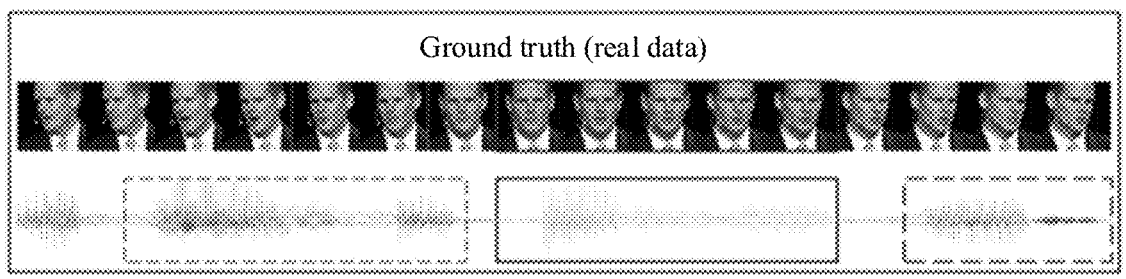
FIG. 7B is a schematic diagram of sampling a training sample according to an embodiment of the present application.

For example, FIG. 7B is a schematic diagram of sampling a training sample according to an embodiment of the present application. The initialized neural network model may be trained in a self-supervised training manner, and no additional ground truth is required. A sampling policy in a training process is shown in FIG. 7B. A solid rectangle shows an audio segment (that is, a positive sample) corresponding to a face of a speaker, and a dashed-line rectangle shows an unmatched audio segment (namely, a negative sample, where the negative sample is generated and obtained by offsetting audio by $\pm \Delta t$ based on the positive sample).

S702: Train an initialized neural network by using the lip movement information of the trained user and the M pieces of audio information as training inputs and by using matching degrees between the lip movement information of the trained user and the M pieces of audio information as M labels, to obtain a target feature matching model.

Specifically, for example, a label between the lip movement information of the trained user and the positive sample, namely, the audio information "Hello, my name is Xiaofang. I'm from Hunan, China. How about you?" is "matching degree=1", and labels between the lip movement information of the trained user and other negative samples, namely, the audio information "Hello, have you had supper?", "It's a very nice day today. Where have you been?", and "Help me find a travel route from Hunan to Beijing?" are respectively "matching degree=0.2", "matching degree=0", and "matching degree=0". Details are not described herein. In other words, the target feature matching model to be used in this application may be obtained by training the initialized neural network model by using the training inputs and the preset labels. The target feature matching model may be used to obtain a matching relationship between to-be-recognized audio information and lip movement information of a plurality of users, to implement any audio matching method in this application.

In a possible implementation, the training an initialized neural network by using the lip movement information of the trained user and the M pieces of audio information as training inputs and by using matching degrees between the lip movement information of the trained user and the M pieces of audio information as M labels, to obtain a target feature matching model includes: inputting the lip movement information of the trained user and the M pieces of audio information into the initialized neural network, and calculating the matching degrees between the M pieces of audio information and the lip movement information of the trained user; and comparing the calculated matching degrees between the M pieces of audio information and the lip movement information of the trained user with the M labels, and training the initialized neural network, to obtain the target feature matching model.

In a possible implementation, the target feature matching model includes a first model, a second model, and a third model; and the inputting the lip movement information of the trained user and the M pieces of audio information into the initialized neural network, and calculating the matching degrees between the M pieces of audio information and the lip movement information of the trained user includes: inputting the M pieces of audio information into the first model, to obtain M audio features, where each of the M audio features is a K-dimensional audio feature, and K is an integer greater than 0; inputting the lip movement information of the trained user into the second model, to obtain an image sequence feature of the trained user, where the image sequence feature of the trained user is a K-dimensional image sequence feature; and inputting the M audio features and the image sequence feature of the trained user into the third model, to calculate matching degrees between the M audio features and the image sequence feature of the trained user.

A specific manner of training the initialized neural network model to obtain the target feature matching model in this application is to be described in subsequent method embodiments on a model application side that correspond to FIG. 7A to FIG. 9F. Therefore, details are not described herein.

In an embodiment of the present application, the target feature matching model is obtained by training the initialized neural network model by using lip movement information of a trained user, audio information that matches the lip movement information of the trained user, and a plurality of pieces of audio information that do not match the lip movement information of the trained user as inputs of the initialized neural network and by using actual matching degrees between the M pieces of audio information and the lip movement information of the trained user as labels. For example, a matching degree corresponding to complete matching, namely, a label, is 1, and a matching degree corresponding to non-matching, namely, a label, is 0. If matching degrees that are between the M pieces of audio information and the lip movement information of the trained user and that are obtained through calculation by using a trained initialized neural network are closer to the M labels, the trained initialized neural network is closer to the target feature matching model.

Figure 8A:
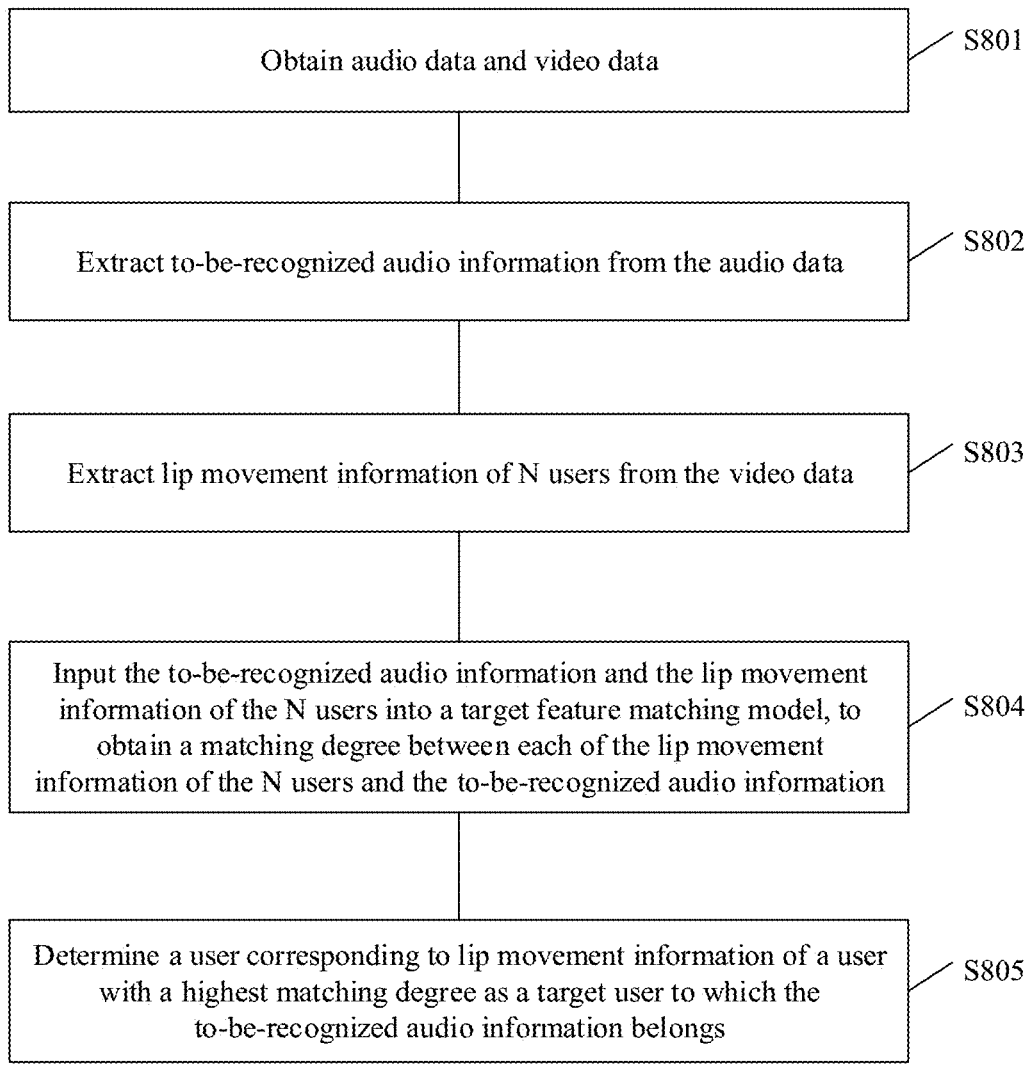
FIG. 8A is a schematic flowchart of an audio matching method according to an embodiment of the present application.

FIG. 8A is a schematic flowchart of an audio matching method according to an embodiment of the present application. The method may be applied to the application scenario in FIG. 1, FIG. 2, or FIG. 3 and the foregoing system architecture, and may be applied to the client device 140 and the execution device 110 in FIG. 4. It may be understood that the client device 140 and the execution device 110 may be located on the same physical device, for example, a smart robot, a smartphone, a smart terminal, or a smart wearable device. The following provides descriptions with reference to FIG. 8A by using an example in which an execution body is a smart device including the client device 140 and the execution device 110. The method may include the following steps S801 to S805.

Step S801: Obtain audio data and video data.

Specifically, obtaining the audio data and the video data means that, for example, the smart device obtains the audio data by using a microphone and obtains the video data by using a camera. Original audio data and video data in a time period are an audio data source and a video data source. Optionally, the audio data and the video data are collected in the same time period and the same scenario, in other words, the audio data is audio data corresponding to the video data. For example, the robot obtains, by using a processor, audio data that is collected by using a microphone in a time period in a scenario, and obtains video data that is collected by using a camera in the time period in the scenario.

Step S802: Extract to-be-recognized audio information from the audio data.

Figure 8B:
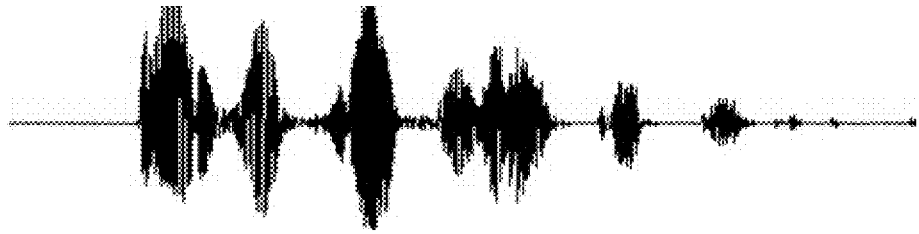
FIG. 8B is an example diagram of a sound waveform according to an embodiment of the present application.

Specifically, the to-be-recognized audio information includes an audio waveform sequence in a target time period. In other words, in an embodiment of the present application, the to-be-recognized audio information includes an audio waveform sequence in a specific time period. Optionally, a format of the audio data is an uncompressed way format. The way format is one of most common sound file formats, and is for a standard digital audio file. The file can record various mono or stereo sound information, and can ensure that a sound is not distorted. Generally, sound quality of a sound restored from the way file depends on a size of a sample obtained by sampling by an audio adapter. A higher sampling frequency indicates better sound quality, higher overheads, and a larger way file. FIG. 8B is an example diagram of a sound waveform according to an embodiment of the present application.

Figure 8C:
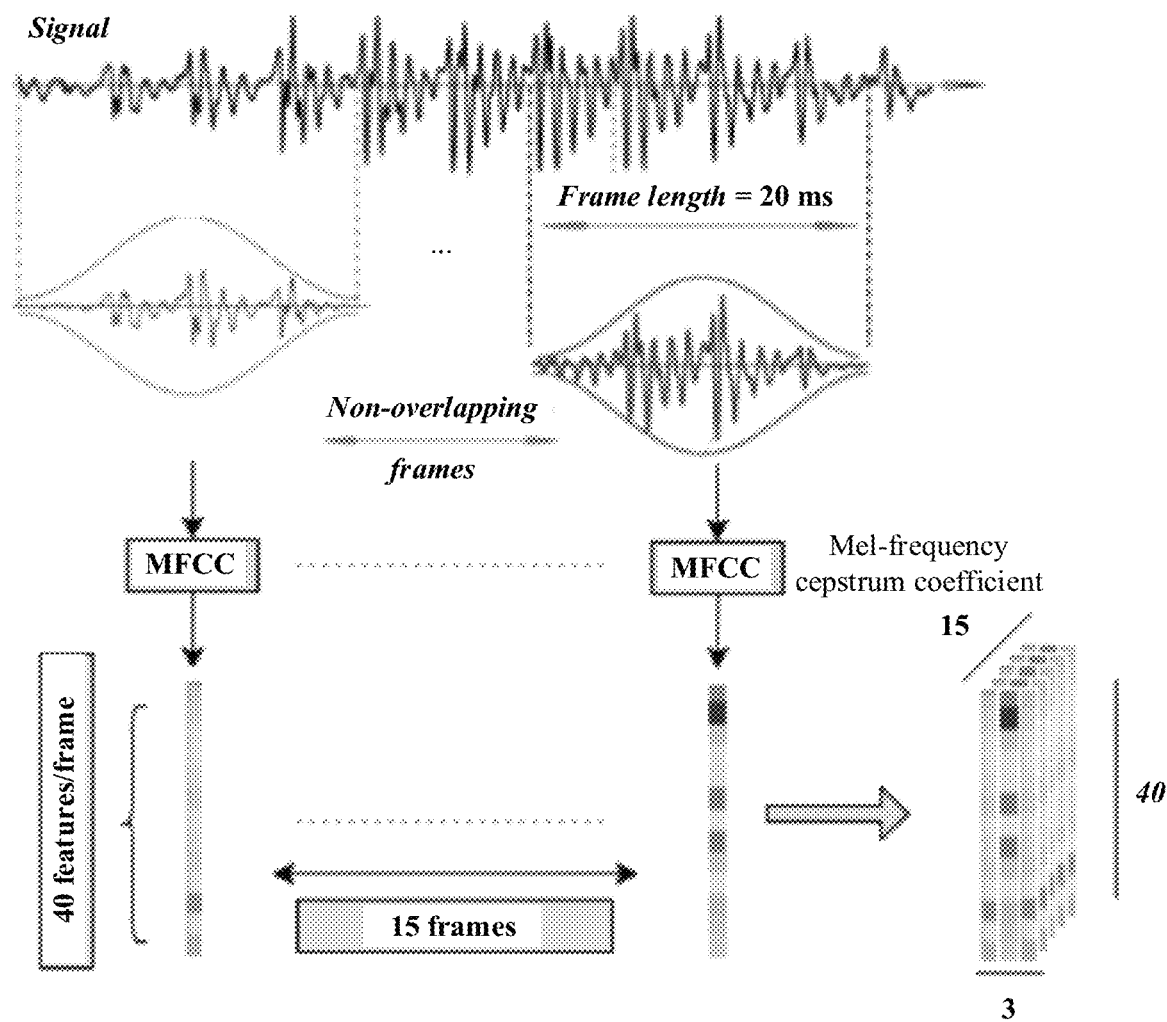
FIG. 8C is a schematic diagram of performing audio feature extraction by using a mel-frequency cepstrum coefficient according to an embodiment of the present application.

In a possible implementation, assuming that the audio data includes audio that is sent by a plurality of users at the same time, a specific user that sends a segment of audio information needs to be determined. In this case, target audio information, namely, the to-be-recognized audio information, needs to be first recognized and extracted from the audio data. Alternatively, assuming that the audio data includes a plurality of segments of audio information sent by a user, the smart device only needs to recognize a segment of audio information. In this case, the segment of audio information is the to-be-recognized audio information. For example, the smart device extracts an audio feature from the audio data obtained by a microphone array in S801. A specific method is shown in FIG. 8C. FIG. 8C is a schematic diagram of performing audio feature extraction by using a mel-frequency cepstrum coefficient according to an embodiment of the present application. A 40-dimensional feature is extracted from data with a frame length of 20 ms by using the mel-frequency cepstrum coefficient (MFCC). Frames do not overlap with each other (non-overlapping). Every 15 frames (corresponding to an audio segment of 0.3 second) are concatenated into a cube whose dimension is 15×40×3 (where 15 represents a temporal feature, and 40×3 represents a 2d spatial feature). An audio waveform sequence in 0.3 s is used as an input of the audio feature, and 0.3 s is the target time period.

In a possible implementation, a manner of extracting the to-be-recognized audio information from the audio data includes: recognizing audio data with different spectrums from the audio data based on a spectrum recognition algorithm, and recognizing audio data with a target spectrum as the to-be-recognized audio information. Spectrums corresponding to sounds sent by different users are usually different. Therefore, in an embodiment of the present application, the audio data with the different spectrums is first recognized from the audio data, and the audio data with the target spectrum is then recognized as the to-be-recognized audio information, to implement the function of extracting the to-be-recognized audio information from the audio data.

Step S803: Extract Lip Movement Information of N Users from the Video Data

Figure 8D:
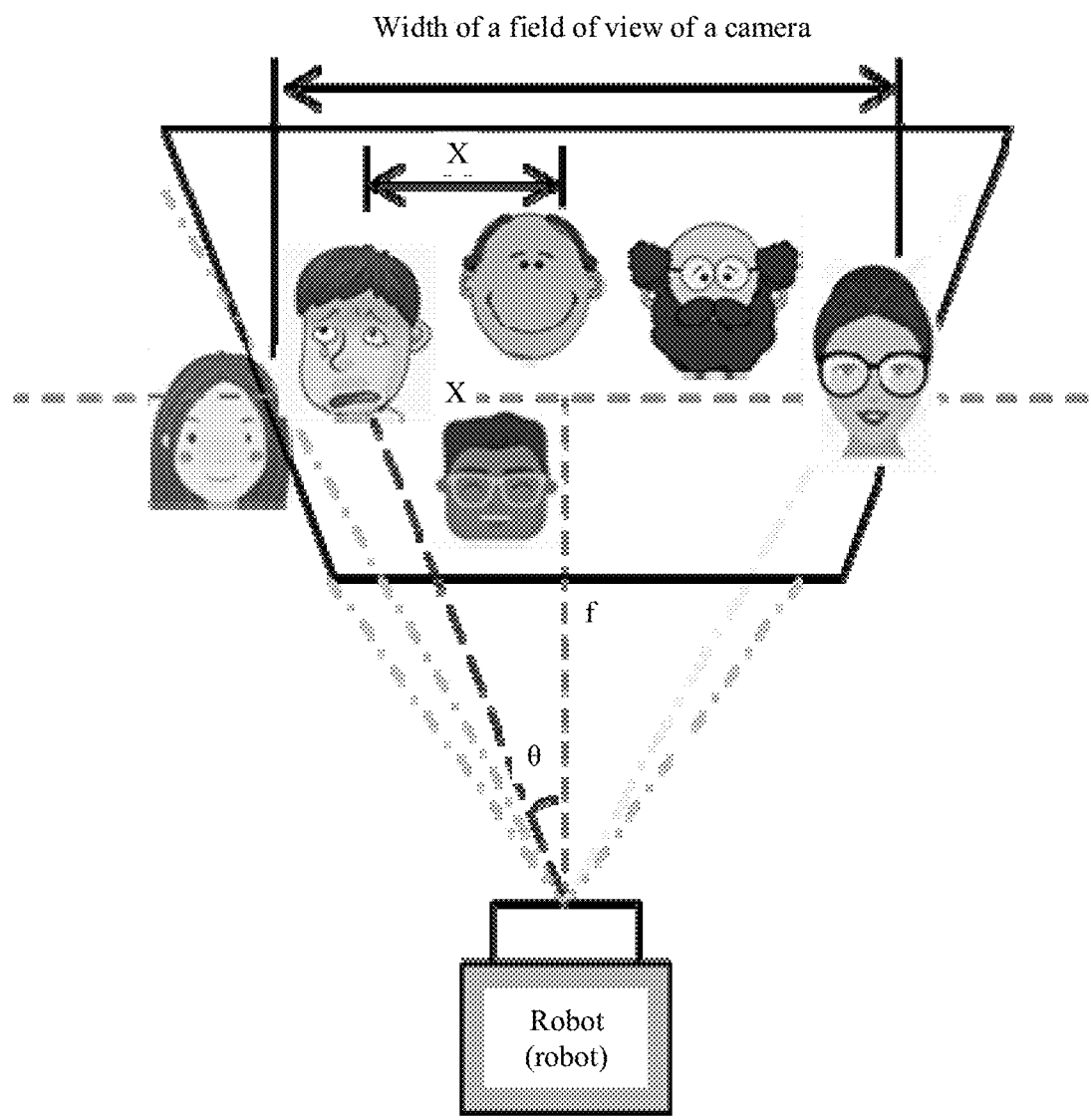
FIG. 8D is a schematic diagram of a scenario in which a robot interacts with members in a family according to an embodiment of the present application.

Specifically, each of the lip movement information of the N users includes a sequence of lip movement images of a corresponding user in the target time period, and N is an integer greater than 1. To be specific, a lip video of each user, namely, a sequence of consecutive lip movement images, is extracted from the original video data, and includes features of continuous mouth changes of the corresponding user. Optionally, a user may include a person, or may include another robot, a biochemical person, a toy pet, a real pet, or the like that can send audio information. For example, a format of each frame of image in the video data collected by using the camera is a 24-bit BMP bitmap. A BMP image file (Bitmap-File) format is a format used in Windows for storing an image file. For a 24-bit image, 3 bytes are used to store a color value, where each byte represents one color, and colors are arranged in red (R), green (G), and blue (B). An RGB color image is converted into a grayscale image. The smart device obtains, based on a face recognition algorithm, at least one face region from the video data collected by the camera, further uses each face region as a unit, and assigns a face ID to each face region. (A scenario described in FIG. 8D is used as an example. FIG. 8D is a schematic diagram of a scenario in which a robot interacts with members in a family according to an embodiment of the present application. In this figure, six face IDs may be extracted from an obtained video). Then, the smart device extracts a video sequence stream for mouth regions. A video frame rate is 30 f/s (Frame rate=Quantity of frames/Time, unit: frames per second (f/s, fps)). Nine consecutive image frames form a video stream with a length of 0.3 second. Video data of the nine image frames (video speed: 30 fps) is concatenated into a cube whose dimension is 9×60×100, where 9 represents the quantity of frames (a temporal feature) indicating time information. Each channel represents a 60×100 grayscale image (a 2d spatial feature) for a mouth cavity region. A sequence of lip movement images corresponding to each of the N users in 0.3 s is used as an input of a video feature, and 0.3 s is the target time period.

In a possible implementation, a specific manner of extracting the lip movement information of N users from the video data includes: recognizing N face regions in the video data based on a face recognition algorithm, and extracting a lip movement video in each of the N face regions; and determining the lip movement information of the N users based on the lip movement video in each face region. In an embodiment of the present application, the face regions are first recognized from the video data, then the lip movement video in each face region is extracted based on the face regions, and the lip movement information of the N users, namely, sequences of lip movement images of corresponding users, are determined based on lip movement videos. For example, the smart device obtains, based on the face recognition algorithm, at least one face region from the video data obtained by the camera, and further extracts a video sequence stream for a mouth region by using each face region as a unit.

Step S804: Input the to-be-recognized audio information and the lip movement information of the N users into a target feature matching model, to obtain a matching degree between each of the lip movement information of the N users and the to-be-recognized audio information.

Specifically, the audio waveform sequence in the target time period and the sequence of lip movement images of each of the N users in the target time period are respectively used as the input of the audio feature and the input of the video feature and input into the target feature matching model, to calculate a matching degree between the audio feature and each of lip movement features of the N users. For example, if the audio feature matches a lip movement feature of a user, a calculated matching degree has a value of 1; or if the audio feature does not match a lip movement feature of a user, a calculated matching degree has a value of 0.

Step S805: Determine a user corresponding to the lip movement information of the user with the highest matching degree as the target user to which the to-be-recognized audio information belongs.

Specifically, a corresponding mouth shape, namely, the lip movement information, that is most likely to send the to-be-recognized audio information is found through matching based on the to-be-recognized audio information and the lip movement information of the N users, namely, mouth shapes of the N users. For example, the to-be-recognized audio information and the lip movement information of the N users are input into, for example, a trained neural network model (for example, the target feature matching model in this application), and the target user to which the to-be-recognized audio information belongs is determined from the N users.

In an embodiment of the present application, when the method is applied to a multi-person dialog scenario, audio data and video data may be collected, and audio information in the audio data may be matched with lip movement information in the video data, so that a target user to which a to-be-recognized audio information belongs can be determined. To be specific, in the multi-person scenario, an audio feature is matched with lip movement features of a plurality of users, to recognize a specific user that sends a piece of to-be-recognized audio information, and then further control or a further operation may be performed based on a recognition result. Different from the conventional technology in which a voiceprint recognition technology or a sound source localization technology is used, the method in this embodiment of the present application does not depend on a sound of a person (a voiceprint is easily affected by the physical condition, age, emotion, and the like of the person), is not interfered by an environment (for example, noise interference in the environment), provides a strong anti-interference capability, and has high recognition efficiency and accuracy.

The to-be-recognized audio information includes an audio waveform sequence in a specific time period, and the lip movement information of the N users includes sequences of lip movement images (namely, lip movement videos) of the plurality of users in the time period in the same scenario, to facilitate subsequent related feature extraction and feature matching. The target feature matching model is used, the to-be-recognized audio information and the lip movement information of the N users are used as inputs of the target feature matching model, the matching degree between each of the lip movement information of the N users and the to-be-recognized audio information is used as an output of the target feature matching model, and the target user to which the to-be-recognized audio information belongs is determined based on the matching degree. Optionally, the target feature matching model is a neural network model.

Figure 9A:
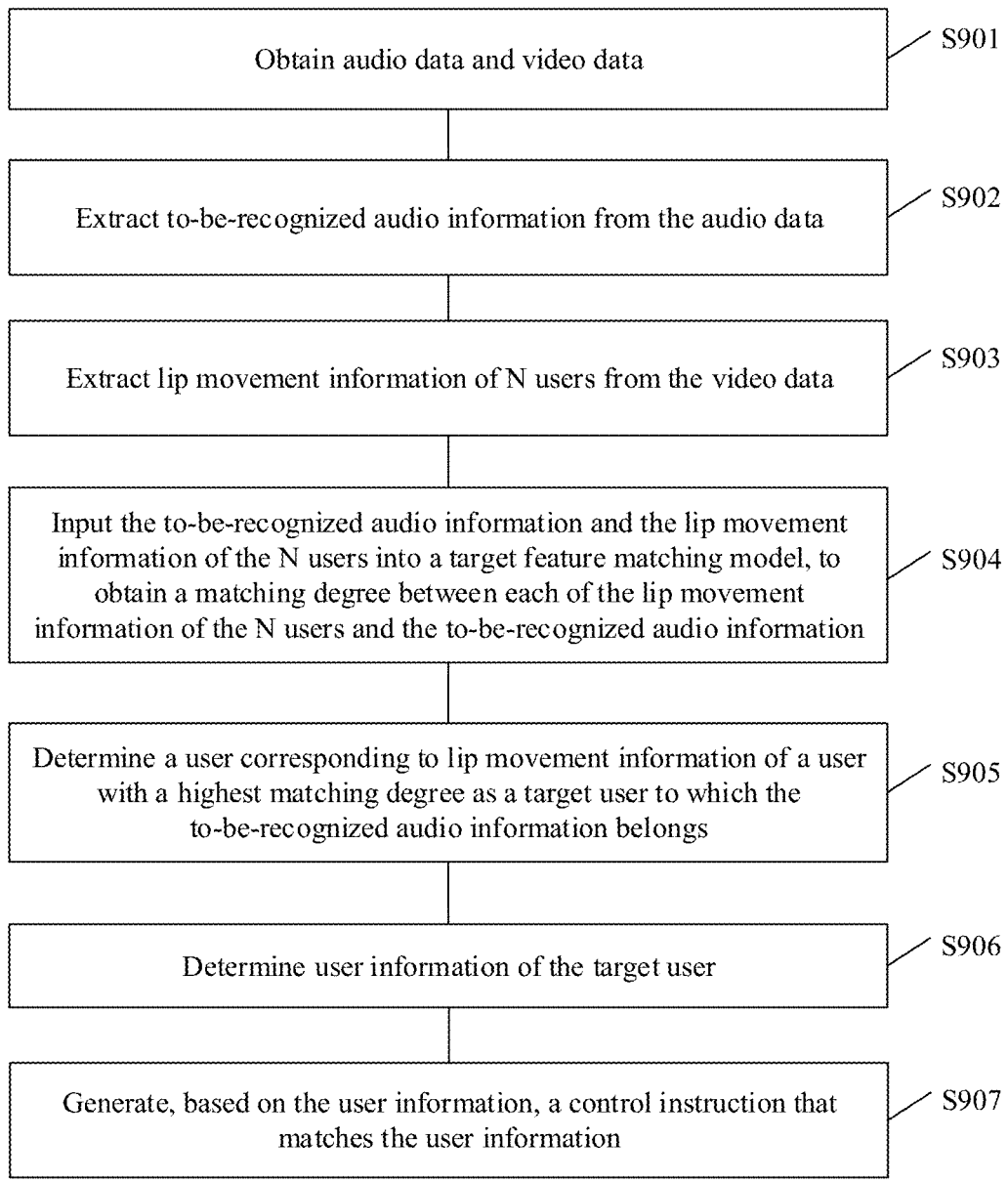
FIG. 9A is a schematic flowchart of another audio matching method according to an embodiment of the present application.

FIG. 9A is a schematic flowchart of another audio matching method according to an embodiment of the present application. The method may be applied to the application scenario in FIG. 1, FIG. 2, or FIG. 3 and the foregoing system architecture, and may be applied to the client device 140 and the execution device 110 in FIG. 4. It may be understood that the client device 140 and the execution device 110 may be located on the same physical device, for example, a smart robot, a smartphone, a smart terminal, or a smart wearable device. The following provides descriptions with reference to FIG. 9A by using an example in which an execution body is a smart device including the client device 140 and the execution device 110. The method may include the following steps S901 to S905. Optionally, the method may further include steps S906 and S907.

Step S901: Obtain audio data and video data, where the audio data and the video data are collected in the same scenario.

Step S902: Extract to-be-recognized audio information from the audio data.

Step S903: Extract lip movement information of N users from the video data, where N is an integer greater than 1.

Specifically, for functions in step S901 to step S903, refer to related descriptions in step S801 to step S803. Details are not described herein again.

Step S904: Input the to-be-recognized audio information and the lip movement information of the N users into a target feature matching model, to obtain a matching degree between each of the lip movement information of the N users and the to-be-recognized audio information.

Specifically, because a sound feature and a visual feature are two modes that differ greatly in essence, and usually have different original frame rates. An audio frame rate is 100 frames per second, and a video frame rate is 24 frames per second. When a direct concatenation method is used, an information loss is caused, and one feature (for example, an audio feature or a video feature) plays a leading role in a model training process. Consequently, model training is difficult to converge, and finally, it is difficult to accurately match audio information and lip movement information. In an embodiment of the present application, two neural network encoders may be separately used to perform layer-by-layer feature extraction on input sequences with different modes, to obtain a higher-layer feature expression. A specific method is as follows: The target feature matching model includes a first model, a second model, and a third model; and the inputting the to-be-recognized audio information and the lip movement information of the N users into a target feature matching model, to obtain a matching degree between each of the lip movement information of the N users and the to-be-recognized audio information includes the following steps S904-A to S904-C.

Step S904-A: Input the to-be-recognized audio information into the first model, to obtain an audio feature, where the audio feature is a K-dimensional audio feature, and M is an integer greater than 0.

Step S904-B: Input the lip movement information of the N users into the second model, to obtain N image sequence features, where each of the N image sequence features is a K-dimensional image sequence feature.

Specifically, in the foregoing steps S904-A and S904-B, the smart device uses the foregoing extracted video sequence and audio sequence as inputs, and performs feature normalization on the input video sequence and the input audio sequence by respectively using the first model and the second model. In other words, a video feature and an audio feature are extracted as features with the same dimension, and both the features are K-dimensional features. This facilitates subsequent feature matching, and facilitates further determining of a face ID corresponding to lip movement information that matches the to-be-recognized audio information. A specific procedure is as follows:

A target feature matching network in this application includes two parts: a feature analysis subnet and a feature matching subnet. However, in an embodiment of the present application, both the first model and the second model are feature analysis subnets, and the third model is a feature matching subnet.

Figure 9B:
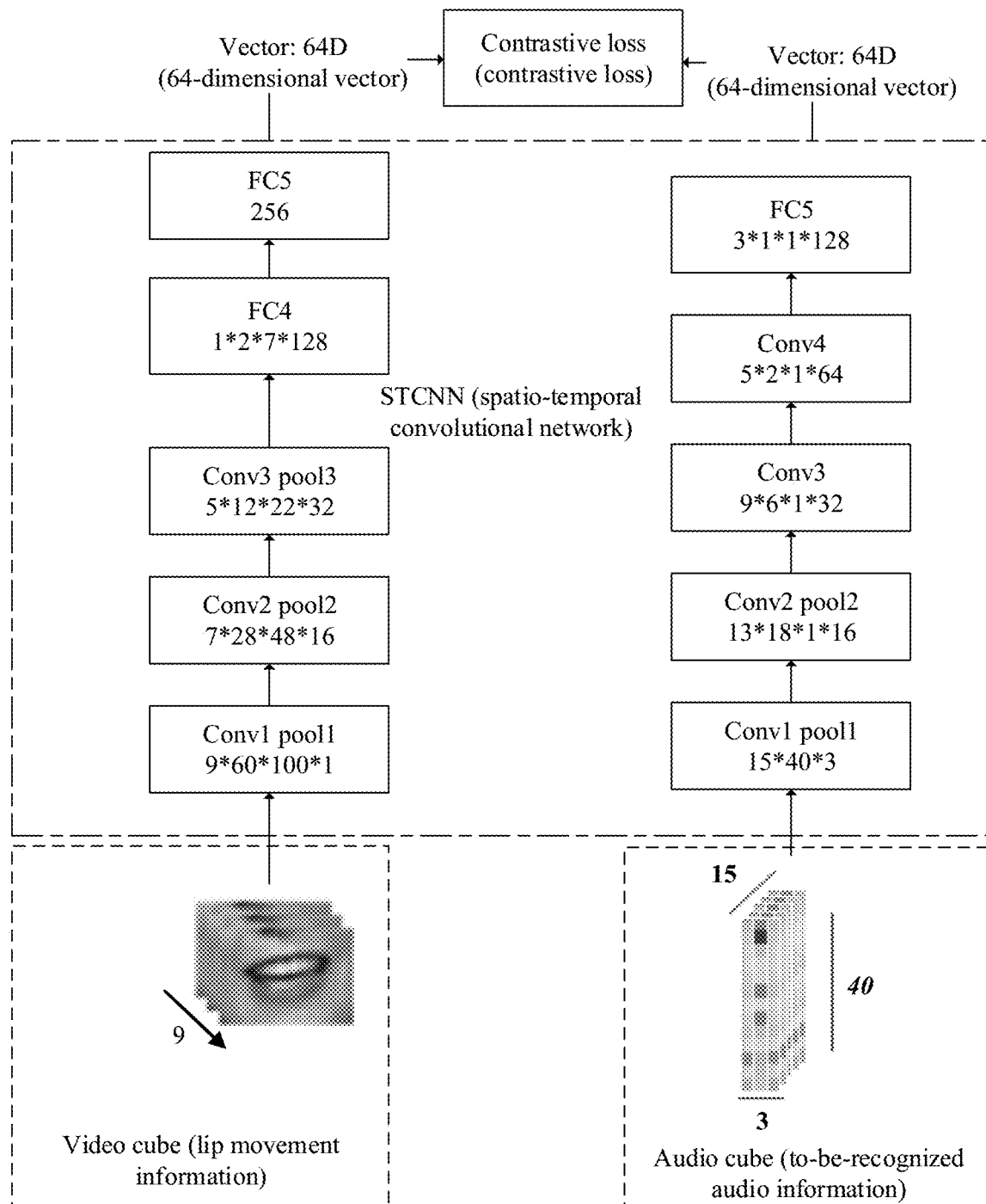
FIG. 9B is a schematic structural diagram of a first model and a second model according to an embodiment of the present application.

(1) Feature analysis subnet (which may also be referred to as a feature analysis submodel):

FIG. 9B is a schematic structural diagram of a first model and a second model according to an embodiment of the present application. The first model and the second model each are used to perform feature normalization on a video sequence stream and an audio feature, and a normalized network type for the first model and the second model is an STCNN (spatio-temporal convolutional network). The second model on the left side in FIG. 9B processes a video stream, and specific compositions include three 3D convolutional and pooling layers (convolution+pooling layer) and two fully connected layers (FC layer). An output is a 64-dimensional feature representation of a sequence of continuous videos. The first model on the right side in FIG. 9B processes an audio stream, and specific compositions include two 3D convolutional and pooling layers (conv+pooling layer), two 3D convolutional layers (cony layer), and one fully connected layer (FC layer). The spatio-temporal convolutional network (STCNN) is used to extract a 2d spatial feature and a temporal feature for both the audio stream and the video stream. An output is a 64-dimensional feature representation of a sequence of continuous audio. In other words, K is equal to 64.

Step S904-C: Input the audio feature and the N image sequence features into the third model, to obtain a matching degree between each of the N image sequence features and the audio feature.

Figure 9C:
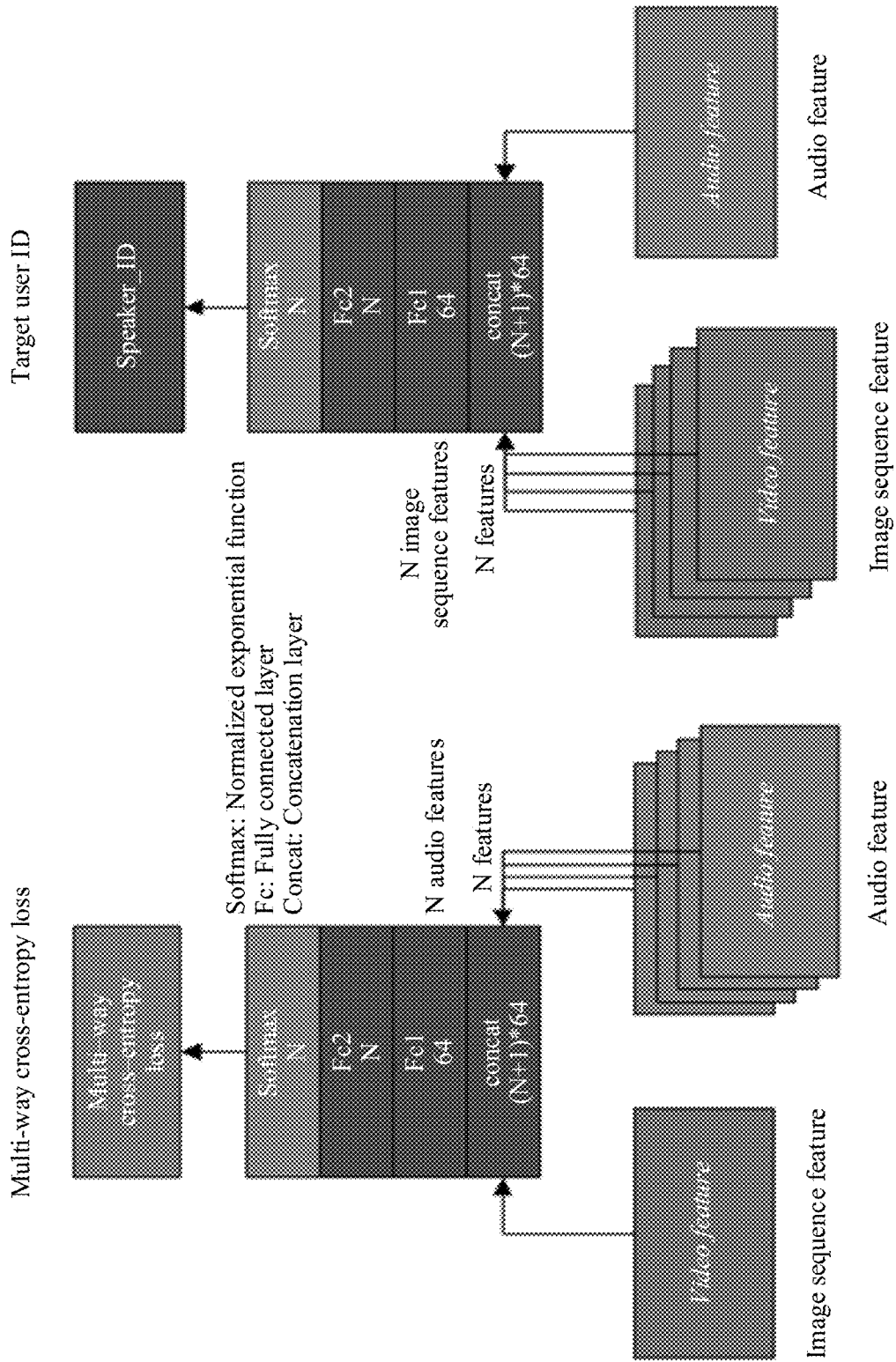
FIG. 9C is a schematic structural diagram of a third model according to an embodiment of the present application.

Specifically, FIG. 9C is a schematic structural diagram of a third model according to an embodiment of the present application. A model training process is shown on the left side in FIG. 9C. A multi-way cross-entropy loss is used as a loss function, a basic network includes one concatenation layer (concat layer), two FC layers, and one softmax layer (softmax function: normalized exponential function). During training, video and audio are input in a ratio of 1:N for end-to-end training. (End-to-end means that there are some data processing systems or learning systems before, and these systems need to be processed in a plurality of phases.

In this case, in end-to-end deep learning, all these different phases are ignored and replaced with a single neural network.) As shown in FIG. 9C, the third model is used to simultaneously compare lip sequence features of all faces in a field of view with a separated audio sequence feature, to obtain a face ID corresponding to the highest matching degree. The right side in FIG. 9C shows a model application process. Based on equivalence between an audio feature and a video feature (which means that features obtained from the audio data and the video data by using the feature analysis networks are all 64-dimensional features), a 1-to-N case is converted into an N-to-1 case, and during inference, the video and the audio are input in the ratio of N:1 (N segments of videos and one segment of audio). Input content is 64-dimensional audio and video features output from the feature analysis subnets in step 3, and an output is an audio and video pair with the highest similarity.

Step S905: Determine a user corresponding to the lip movement information of the user with the highest matching degree as the target user to which the to-be-recognized audio information belongs.

Step S906: Determine user information of the target user, where the user information includes one or more of character attribute information, facial expression information corresponding to the to-be-recognized audio information, and environment information corresponding to the to-be-recognized audio information.

Step S907: Generate, based on the user information, a control instruction that matches the user information.

Specifically, in an embodiment of the present application, after the specific target user that sends the to-be-recognized audio information in the current scenario is determined, the control instruction (for example, an audio instruction or an operation instruction) that matches the user information may be determined based on the attribute information (for example, gender, age, and personality) of the user, the facial expression information (for example, an expression corresponding to the to-be-recognized audio information sent by the target user), and the corresponding environment information (for example, the target user is currently in an office environment, a home environment, or an entertainment environment). For example, a smart robot is controlled to send audio, an operation, or the like that matches the expression data, the character attribute information, and the like to the target user, where the audio or the operation includes a tone of the robot, a head turning of the robot, and reply content of the robot.

Figure 9D:
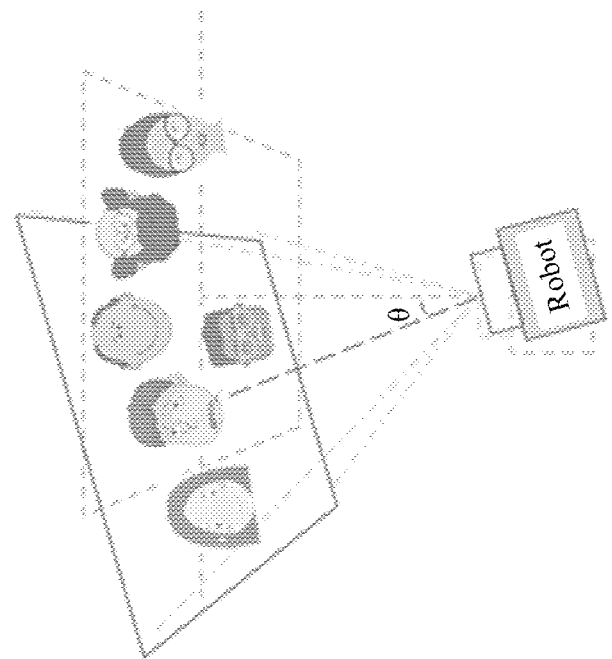
FIG. 9D is a schematic diagram of a robot interaction scenario according to an embodiment of the present application.
Figure 9D:
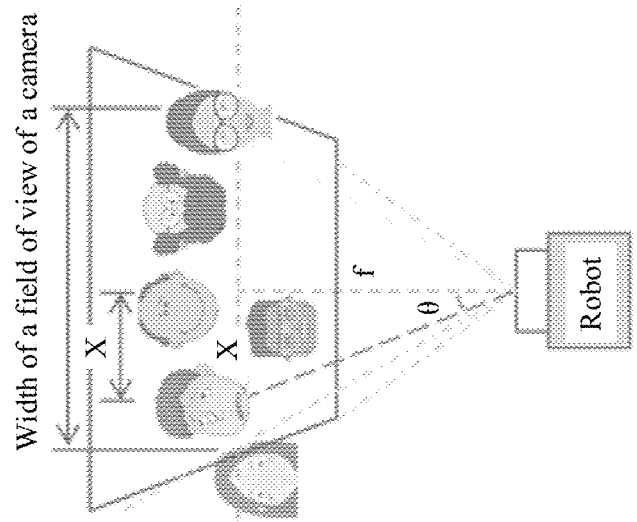

FIG. 9D is a schematic diagram of a robot interaction scenario according to an embodiment of the present application. In the scenario example shown in FIG. 9D, an audio and video pair with the highest similarity is a video including Tom's face and audio sent by Tom. Therefore, in this step, it can be determined that a face ID for sending the instruction is a face ID corresponding to Tom.

(1) After a matching result is obtained, the smart device obtains a detailed user profile of the user based on the determined face ID and a knowledge graph stored in a storage module. The knowledge graph includes a personal feature of the user, a dialog context (in this embodiment of the present application, the dialog context includes a context of a dialog between sister Kris (telling Tom that there is a rainstorm tomorrow) and little brother Jerry (clamoring to go with Tom) in the scenario example shown in FIG. 9D), and a preference of the user.

(2) After the matching result is obtained, the smart device obtains latest real-time facial expression data by using a facial expression network based on a face region corresponding to the face ID.

(3) After the matching result is obtained, the smart device calculates a horizontal angle and a vertical angle after movement of a mechanical structure of the robot based on a boundary/bounding box (bbox) of the face and a width of a field of view of the camera (as shown in a scenario example in FIG. 9F), and sends the horizontal angle and the vertical angle to a motor control system, to drive the robot to turn to the user. A specific calculation formula is as follows:

θ is calculated. The head of the robot directly rotates by an angle of θ leftward/rightward to ensure that a face center overlaps with a center of the field of view. The formula is θ=arctan(x/f).

Figure 9E:
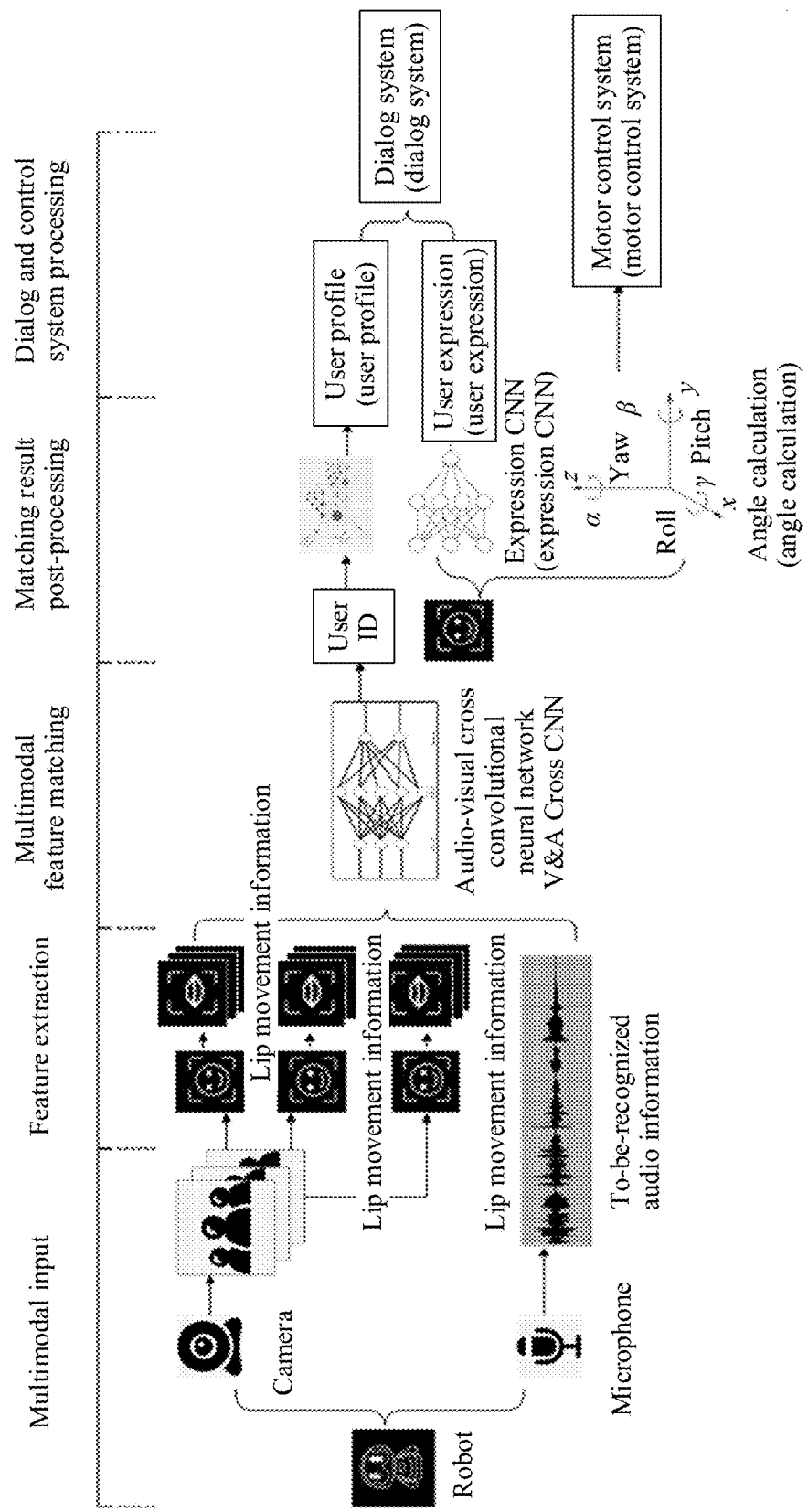
FIG. 9E is a schematic diagram of a functional module and an entire procedure according to an embodiment of the present application.

FIG. 9E is a schematic diagram of a functional module and an entire procedure according to an embodiment of the present application. In this figure, multimodal input, feature extraction, feature matching, matching result post-processing, and dialog and control system processing are included. This embodiment of the present application focuses on a feature extraction module, a multimodal feature matching network, and a post-processing module. A multimodal input module includes a user-side terminal device (in this embodiment of the present application, a robot is used as an example):

Camera: The camera is configured to obtain an image/video. Specifically, in the present application, the obtained image/video includes information from a plurality of persons.

Microphone: The microphone is configured to pick up audio. In the present application, the obtained image/video includes information from a plurality of persons.

A neural network processor, namely, the feature extraction module, may be a part of a processing module (not shown in the figure) of the user-side terminal device, and may be implemented by software, for example, a segment of code. The feature extraction module is configured to: obtain, based on a face recognition algorithm, at least one face region from video data obtained by the camera, and extract a video sequence stream for a mouth region in each face region. The feature extraction module is further configured to extract an audio feature from audio data obtained by a microphone array.

The multimodal feature matching module is configured to obtain, by using a V&A Cross CNN and based on the video sequence stream and the audio feature that are extracted by the feature extraction module, a mouth shape and a face ID that matches the audio.

The matching result post-processing module is configured to obtain a detailed user profile of the user based on the face ID obtained by the multimodal feature matching module and a knowledge graph stored in a storage module (not shown in the figure, where the storage module may be a cloud server, or may be deployed on the robot, or may be partially deployed on a cloud and partially deployed on the robot).

A common processor, namely, the matching result post-processing module, is further configured to obtain latest real-time facial expression data by using a facial expression network and based on the face region that is obtained by the feature extraction module and that corresponds to the face ID.

The matching result post-processing module is further configured to calculate a movement angle of a mechanical structure of the robot based on a boundary/bounding box (bbox) and a preset algorithm.

The dialog and control system processing module includes a dialog module and a control module. The dialog module is configured to derive a reply to the audio based on the user profile and the facial expression data that are obtained by the matching result post-processing module. The control module is configured to: control, based on the movement angle obtained by the matching result post-processing module and by using a motor control system (where the motor is also referred to as a servomotor, and was first used to implement a steering function on a ship; and the motor is widely applied to various joint movements of the robot because a rotation angle of the motor can be continuously controlled by using a program), to drive the robot to turn to the user.

Figure 9F:
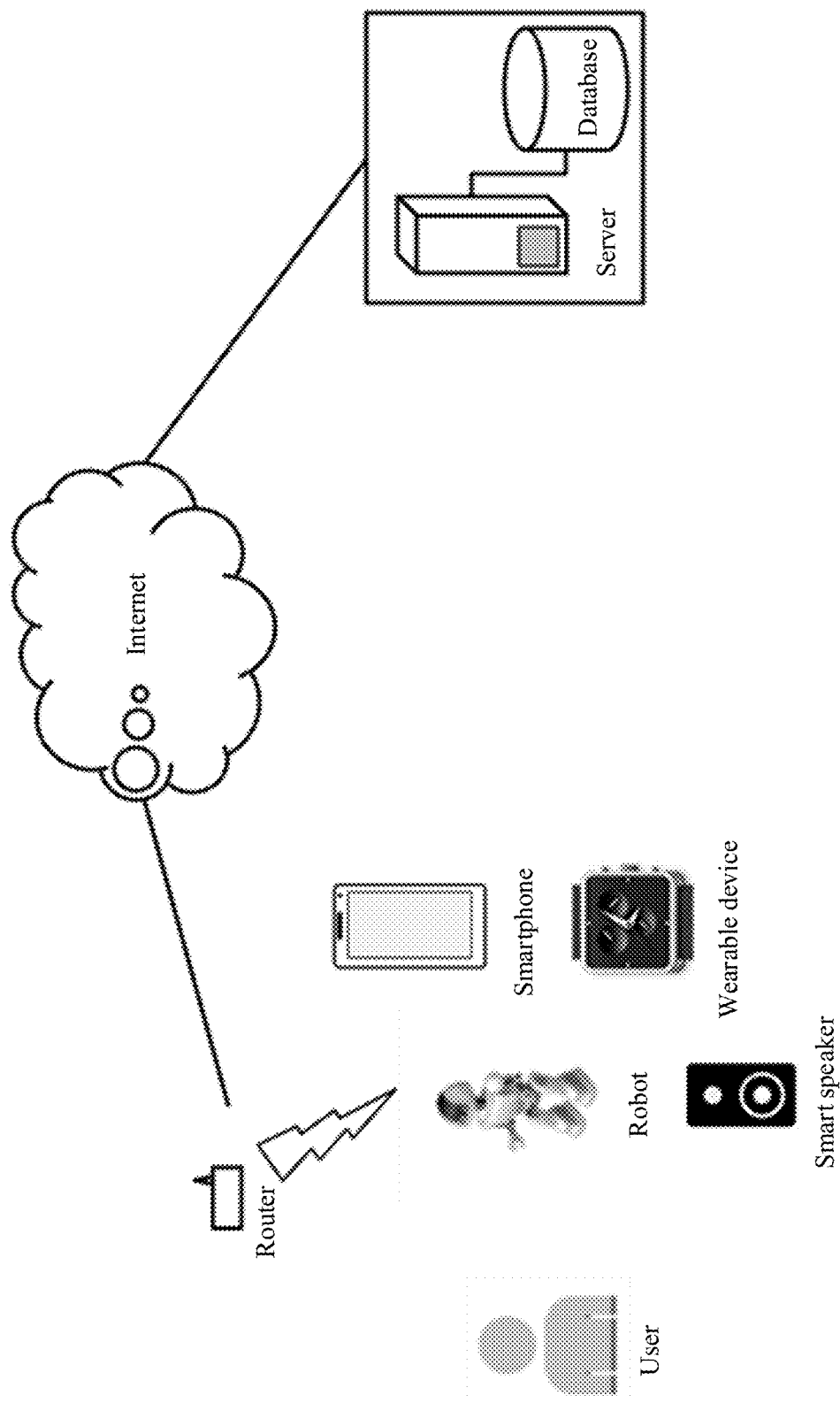
FIG. 9F is an architectural diagram of an audio matching system according to an embodiment of the present application.

An embodiment of the present application further provides another audio matching method. The method may be applied to the application scenario in FIG. 1, FIG. 2, or FIG. 3 and the foregoing system architecture, and may be applied to the execution device 110 in FIG. 4. It may be understood that, in this case, the client device 140 and the execution device 110 may not be located on the same physical device. FIG. 9F is an architectural diagram of an audio matching system according to an embodiment of the present application. In this system, for example, a client device 140 is a smart robot, a smartphone, a smart speaker, or a smart wearable device. The client device 140 is used as a device for collecting audio data and video data. Further, the client device 140 may be used as a device for extracting to-be-recognized audio information and lip information of N users, whereas a server/service device/service apparatus/cloud service device on which the execution device 110 is located may perform matching between the extracted to-be-recognized audio information and the extracted lip information of the N users. Optionally, extraction of the to-be-recognized audio information and the N pieces of user lip information may also be performed on a device side on which the execution device 110 is located. This is not specifically limited in this embodiment of the present application. The following provides descriptions with reference to FIG. 9F by using an example in which an execution body is a cloud service device including the execution device 110. The method may include the following steps S1001 to S1003:

Step S1001: Obtain to-be-recognized audio information and lip movement information of N users, where the to-be-recognized audio information includes an audio waveform sequence in a target time period, each of the lip movement information of the N users includes a sequence of lip movement images of a corresponding user in the target time period, and N is an integer greater than 1.

Step S1002: Input the to-be-recognized audio information and the lip movement information of the N users into a target feature matching model, to obtain a matching degree between each of the lip movement information of the N users and the to-be-recognized audio information.

Step S1003: Determine a user corresponding to the lip movement information of the user with the highest matching degree as the target user to which the to-be-recognized audio information belongs.

In a possible implementation, the target feature matching model includes a first model, a second model, and a third model; and the inputting the to-be-recognized audio information and the lip movement information of the N users into a target feature matching model, to obtain a matching degree between each of the lip movement information of the N users and the to-be-recognized audio information includes:
inputting the to-be-recognized audio information into the first model, to obtain an audio feature, where the audio feature is a K-dimensional audio feature, and K is an integer greater than 0;
inputting the lip movement information of the N users into the second model, to obtain N image sequence features, where each of the N image sequence features is a K-dimensional image sequence feature; and
inputting the audio feature and the N image sequence features into the third model, to obtain a matching degree between each of the N image sequence features and the audio feature.

In a possible implementation, the target feature matching model is a feature matching model obtained through training by using lip movement information of a trained user and M pieces of audio information as inputs and by using matching degrees between the lip movement information of the trained user and the M pieces of audio information as M labels.

In a possible implementation, the method further includes:
determining user information of the target user, where the user information includes one or more of character attribute information, facial expression information corresponding to the to-be-recognized audio information, and environment information corresponding to the to-be-recognized audio information; and
generating, based on the user information, a control instruction that matches the user information.

In a possible implementation, the method further includes: extracting the lip movement information of the N users from video data. Further, the extracting the lip movement information of the N users from video data includes:
recognizing N face regions in the video data based on a face recognition algorithm, and extracting a lip movement video in each of the N face regions; and
determining the lip movement information of the N users based on the lip movement video in each face region.

In a possible implementation, the method further includes: extracting the to-be-recognized audio information from the audio data. Further, the extracting the to-be-recognized audio information from the audio data includes:
recognizing audio data with different spectrums from the audio data based on a spectrum recognition algorithm, and recognizing audio data with a target spectrum as the to-be-recognized audio information.

It should be noted that, for a procedure of the method performed by the cloud service device and described in this embodiment of the present application, reference may be made to the related method embodiments in FIG. 1 to FIG. 9F, and therefore details are not described herein again.

Figure 10A:
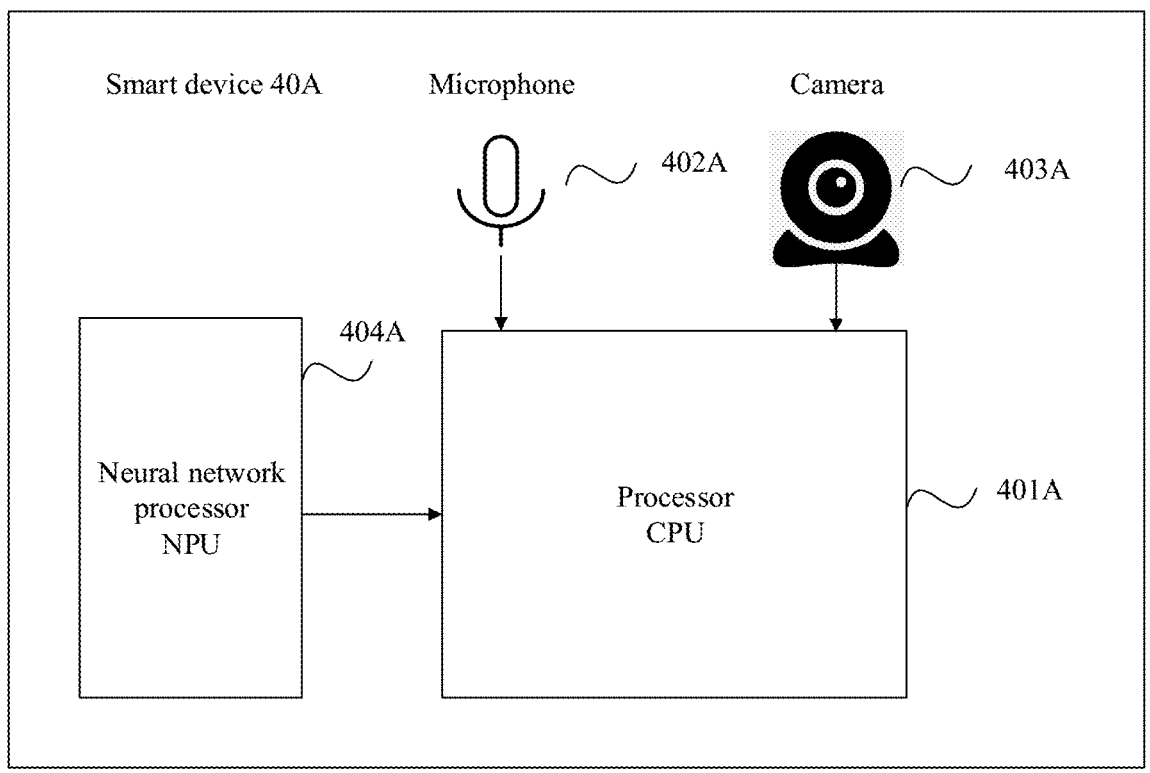
FIG. 10A is a schematic structural diagram of a smart device according to an embodiment of the present application.

FIG. 10A is a schematic structural diagram of a smart device according to an embodiment of the present application, and FIG. 10A is a schematic diagram of a function principle of the smart device according to an embodiment of the present application. The smart device may be a smart robot, a smartphone, a smart speaker, a smart wearable device, or the like. The smart device 40A may include a processor 401A, and a microphone 402A, a camera 403A, and a neural network processor 404A that are coupled to the processor 401A.

The microphone 402A is configured to collect audio data.

The camera 403A is configured to collect video data, where the audio data and the video data are collected in the same scenario.

The processor 401A is configured to: obtain the audio data and the video data; extract to-be-recognized audio information from the audio data; and extract lip movement information of N users from the video data, where N is an integer greater than 1.

The neural network processor 404A is configured to determine, from the N users based on the to-be-recognized audio information and the lip movement information of the N users, a target user to which the to-be-recognized audio information belongs.

In a possible implementation, the to-be-recognized audio information includes an audio waveform sequence in a target time period; and each of the lip movement information of the N users includes a sequence of lip movement images of a corresponding user in the target time period.

In a possible implementation, the neural network processor 404A is configured to: input the to-be-recognized audio information and the lip movement information of the N users into a target feature matching model, to obtain a matching degree between each of the lip movement information of the N users and the to-be-recognized audio information; and determine a user corresponding to the lip movement information of the user with the highest matching degree as the target user to which the to-be-recognized audio information belongs.

In a possible implementation, the target feature matching model includes a first model, a second model, and a third model; and the neural network processor 404A is configured to: input the to-be-recognized audio information into the first model, to obtain an audio feature, where the audio feature is a K-dimensional audio feature, and K is an integer greater than 0; input the lip movement information of the N users into the second model, to obtain N image sequence features, where each of the N image sequence features is a K-dimensional image sequence feature; and input the audio feature and the N image sequence features into the third model, to obtain a matching degree between each of the N image sequence features and the audio feature.

In a possible implementation, the target feature matching model is a feature matching model obtained through training by using lip movement information of a trained user and M pieces of audio information as inputs and by using matching degrees between the lip movement information of the trained user and the M pieces of audio information as M labels, where the M pieces of audio information include audio information that matches the lip movement information of the trained user.

In a possible implementation, the processor 401A is further configured to: determine user information of the target user, where the user information includes one or more of character attribute information, facial expression information corresponding to the to-be-recognized audio information, and environment information corresponding to the to-be-recognized audio information; and generate, based on the user information, a control instruction that matches the user information.

In a possible implementation, the processor 401A is configured to: recognize N face regions in the video data based on a face recognition algorithm, and extract a lip movement video in each of the N face regions; and determine the lip movement information of the N users based on the lip movement video in each face region.

In a possible implementation, the processor 401A is configured to: recognize audio data with different spectrums from the audio data based on a spectrum recognition algorithm, and recognize audio data with a target spectrum as the to-be-recognized audio information.

It should be noted that, for functions of the related modules of the smart device 40A described in this embodiment of the present application, reference may be made to the related method embodiments in FIG. 1 to FIG. 9F, and therefore details are not described herein again.

Each unit in FIG. 10A may be implemented by software, hardware, or a combination thereof. A unit implemented by hardware may include a logic circuit, an algorithm circuit, an analog circuit, or the like. A unit implemented by software may include a program instruction, is considered as a software product stored in a memory, and may be run by a processor to implement a related function. For details, refer to the foregoing descriptions.

Figure 10B:
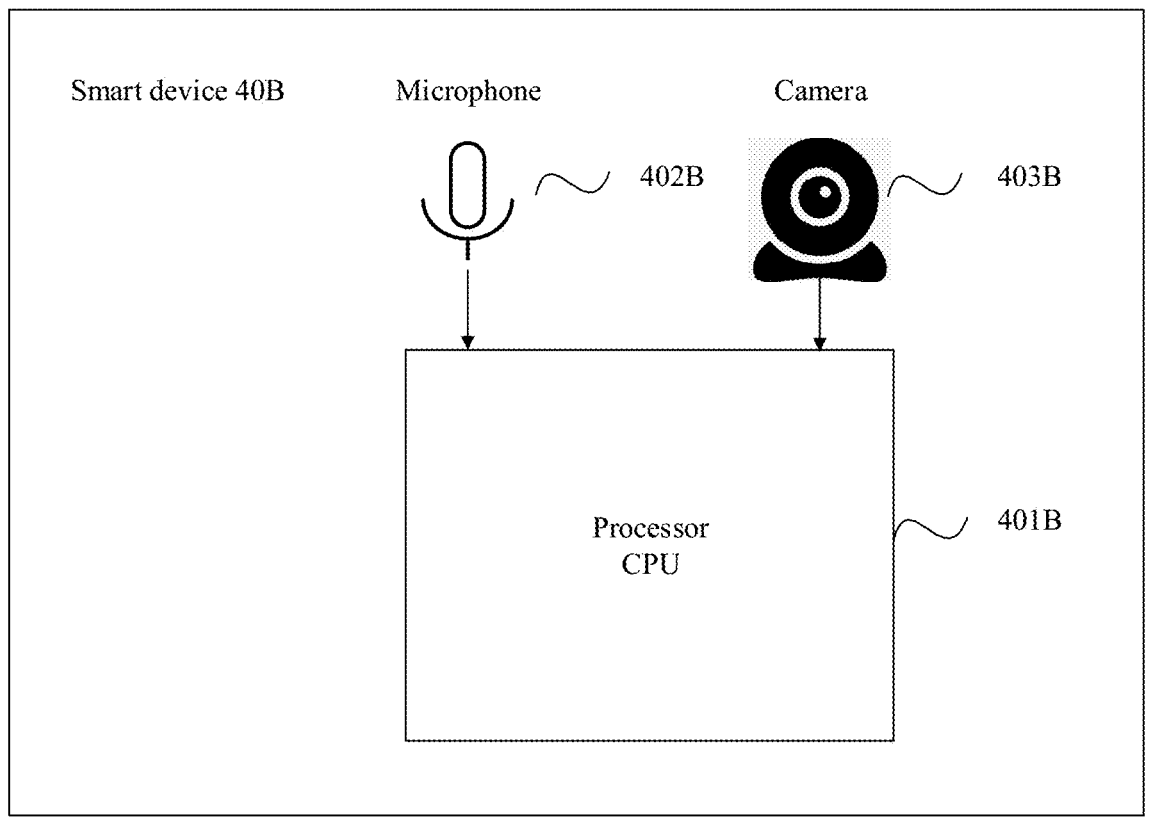
FIG. 10B is a schematic structural diagram of another smart device according to an embodiment of the present application.

FIG. 10B is a schematic structural diagram of another smart device according to an embodiment of the present application, and FIG. 10B is a schematic diagram of a function principle of the smart device according to this embodiment of the present application. The smart device may be a smart robot, a smartphone, a smart speaker, a smart wearable device, or the like. The smart device 40B may include a processor 401B, and a microphone 402B and a camera 403B that are coupled to the processor 401B.

The microphone 402B is configured to collect audio data.

The camera 403B is configured to collect video data, where the audio data and the video data are collected in the same scenario.

The processor 401B is configured to:
  obtain the audio data and the video data; extract to-be-recognized audio information from the audio data; and extract lip movement information of N users from the video data, where N is an integer greater than 1; and
  determine, from the N users based on the to-be-recognized audio information and the lip movement information of the N users, a target user to which the to-be-recognized audio information belongs.

In a possible implementation, the to-be-recognized audio information includes an audio waveform sequence in a target time period; and each of the lip movement information of the N users includes a sequence of lip movement images of a corresponding user in the target time period.

In a possible implementation, the processor 404B is configured to: input the to-be-recognized audio information and the lip movement information of the N users into a target feature matching model, to obtain a matching degree between each of the lip movement information of the N users and the to-be-recognized audio information; and determine a user corresponding to the lip movement information of the user with the highest matching degree as the target user to which the to-be-recognized audio information belongs.

In a possible implementation, the target feature matching model includes a first model, a second model, and a third model; and the neural network processor 404B is configured to: input the to-be-recognized audio information into the first model, to obtain an audio feature, where the audio feature is a K-dimensional audio feature, and K is an integer greater than 0; input the lip movement information of the N users into the second model, to obtain N image sequence features, where each of the N image sequence features is a K-dimensional image sequence feature; and input the audio feature and the N image sequence features into the third model, to obtain a matching degree between each of the N image sequence features and the audio feature.

In a possible implementation, the target feature matching model is a feature matching model obtained through training by using lip movement information of a trained user and M pieces of audio information as inputs and by using matching degrees between the lip movement information of the trained user and the M pieces of audio information as M labels, where the M pieces of audio information include audio information that matches the lip movement information of the trained user.

In a possible implementation, the processor 401B is further configured to: determine user information of the target user, where the user information includes one or more of character attribute information, facial expression information corresponding to the to-be-recognized audio information, and environment information corresponding to the to-be-recognized audio information; and generate, based on the user information, a control instruction that matches the user information.

In a possible implementation, the processor 401B is configured to: recognize N face regions in the video data based on a face recognition algorithm, and extract a lip movement video in each of the N face regions; and determine the lip movement information of the N users based on the lip movement video in each face region.

In a possible implementation, the processor 401B is configured to: recognize audio data with different spectrums from the audio data based on a spectrum recognition algorithm, and recognize audio data with a target spectrum as the to-be-recognized audio information.

It should be noted that, for functions of the related modules of the smart device 40B described in this embodiment of the present application, reference may be made to the related method embodiments in FIG. 1 to FIG. 9F, and therefore details are not described herein again.

Each unit in FIG. 10B may be implemented by software, hardware, or a combination thereof. A unit implemented by hardware may include a logic circuit, an algorithm circuit, an analog circuit, or the like. A unit implemented by software may include a program instruction, is considered as a software product stored in a memory, and may be run by a processor to implement a related function. For details, refer to the foregoing descriptions.

Figure 11:
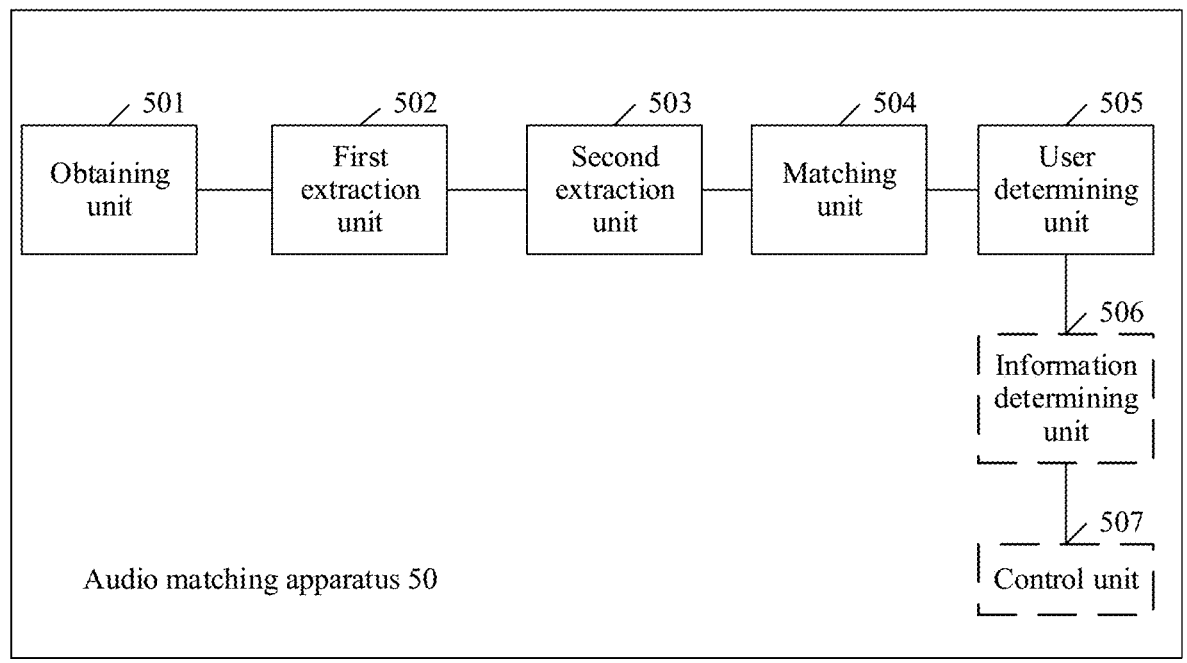
FIG. 11 is a schematic structural diagram of an audio matching apparatus according to an embodiment of the present application.

FIG. 11 is a schematic structural diagram of an audio matching apparatus according to an embodiment of the present application, and FIG. 11 is a schematic diagram of a function principle of a smart device according to an embodiment of the present application. The smart device may be a smart robot, a smartphone, a smart speaker, a smart wearable device, or the like. The audio matching apparatus 50 may include an obtaining unit 501, a first extraction unit 502, a second extraction unit 503, and a matching unit 504.

The obtaining unit 501 is configured to obtain audio data and video data.

The first extraction unit 502 is configured to extract to-be-recognized audio information from the audio data, where the to-be-recognized audio information includes an audio waveform sequence in a target time period.

The second extraction unit 503 is configured to extract lip movement information of N users from the video data, where each of the lip movement information of the N users includes a sequence of lip movement images of a corresponding user in the target time period, and N is an integer greater than 1.

The matching unit 504 is configured to input the to-be-recognized audio information and the lip movement information of the N users into a target feature matching model, to obtain a matching degree between each of the lip movement information of the N users and the to-be-recognized audio information.

A user determining unit 505 is configured to determine a user corresponding to the lip movement information of the user with the highest matching degree as the target user to which the to-be-recognized audio information belongs.

In a possible implementation, the target feature matching model includes a first network, a second network, and a third network; and the matching unit 504 is configured to:
input the to-be-recognized audio information into the first network, to obtain an audio feature, where the audio feature is a K-dimensional audio feature, and K is an integer greater than 0;
input the lip movement information of the N users into the second network, to obtain N image sequence features, where each of the N image sequence features is a K-dimensional image sequence feature; and
input the audio feature and the N image sequence features into the third network, to obtain a matching degree between each of the N image sequence features and the audio feature.

In a possible implementation, the target feature matching model is a feature matching model obtained through training by using lip movement information of a trained user and M pieces of audio information as inputs and by using matching degrees between the lip movement information of the trained user and the M pieces of audio information as M labels. Optionally, the M pieces of audio information include audio information that matches the lip movement information of the trained user and (M−1) pieces of audio information that do not match the lip movement information of the trained user.

In a possible implementation, the apparatus further includes:
an information determining unit 506, configured to determine user information of the target user, where the user information includes one or more of character attribute information, facial expression information corresponding to the to-be-recognized audio information, and environment information corresponding to the to-be-recognized audio information; and
a control unit 507, configured to generate, based on the user information, a control instruction that matches the user information.

In a possible implementation, the first extraction unit 502 is configured to:
recognize audio data with different spectrums from the audio data based on a spectrum recognition algorithm, and recognize audio data with a target spectrum as the to-be-recognized audio information.

In a possible implementation, the second extraction unit 503 is configured to:
recognize N face regions in the video data based on a face recognition algorithm, and extract a lip movement video in each of the N face regions; and
determine the lip movement information of the N users based on the lip movement video in each face region.

It should be noted that, for functions of the related modules of the audio matching apparatus 50 described in this embodiment of the present application, reference may be made to the related method embodiments in FIG. 1 to FIG. 9F, and therefore details are not described herein again.

Each unit in FIG. 11 may be implemented by software, hardware, or a combination thereof. A unit implemented by hardware may include a logic circuit, an algorithm circuit, an analog circuit, or the like. A unit implemented by software may include a program instruction, is considered as a software product stored in a memory, and may be run by a processor to implement a related function. For details, refer to the foregoing descriptions.

Figure 12:
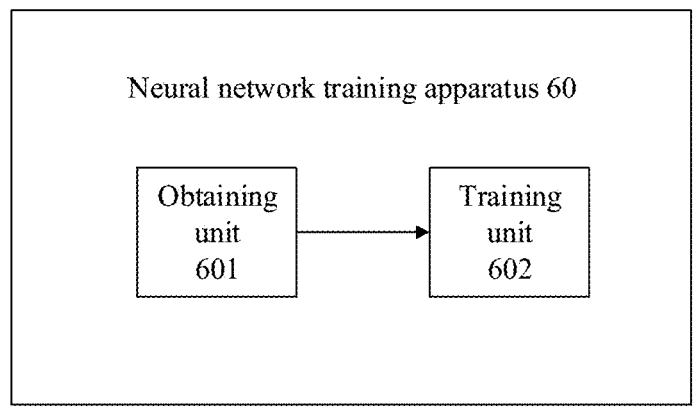
FIG. 12 is a schematic structural diagram of a neural network training apparatus according to an embodiment of the present application.

FIG. 12 is a schematic structural diagram of a neural network training apparatus according to an embodiment of the present application, and FIG. 12 is a schematic diagram of a function principle of a smart device according to an embodiment of the present application. The neural network training apparatus may be a smart robot, a smartphone, a smart speaker, a smart wearable device, or the like. The neural network training apparatus 60 may include an obtaining unit 601 and a training unit 602.

The obtaining unit 601 is configured to obtain training samples, where the training samples include lip movement information of a trained user and M pieces of audio information. Optionally, the M pieces of audio information include audio information that matches the lip movement information of the trained user and (M−1) pieces of audio information that do not match the lip movement information of the trained user.

The training unit 602 is configured to train an initialized neural network by using the lip movement information of the trained user and the M pieces of audio information as training inputs and by using matching degrees between the lip movement information of the trained user and the M pieces of audio information as M labels, to obtain a target feature matching model.

In a possible implementation, the lip movement information of the trained user includes a sequence of lip movement images of the trained user, and the M pieces of audio information include one audio waveform sequence that matches the sequence of lip movement images of the trained user and (M−1) audio waveform sequences that do not match the sequence of lip movement images of the trained user.

In a possible implementation, the training unit 602 is configured to:
input the lip movement information of the trained user and the M pieces of audio information into the initialized neural network, to calculate the matching degrees between the M pieces of audio information and the lip movement information of the trained user; and
compare the calculated matching degrees between the M pieces of audio information and the lip movement information of the trained user with the M labels, and train the initialized neural network, to obtain the target feature matching model.

In a possible implementation, the target feature matching model includes a first model, a second model, and a third model; and the training unit 602 is configured to:
input the M pieces of audio information into the first model, to obtain M audio features, where each of the M audio features is a K-dimensional audio feature, and K is an integer greater than 0;
input the lip movement information of the trained user into the second model, to obtain an image sequence feature of the trained user, where the image sequence feature of the trained user is a K-dimensional image sequence feature;
input the M audio features and the image sequence feature of the trained user into the third model, to calculate matching degrees between the M audio features and the image sequence feature of the trained user; and
compare the calculated matching degrees between the M audio features and the image sequence feature of the trained user with the M labels, and train the initialized neural network, to obtain the target feature matching model.

It should be noted that, for functions of the related modules of the neural network training apparatus 60 described in this embodiment of the present application, reference may be made to the related method embodiments in FIG. 1 to FIG. 9F, and therefore details are not described herein again.

Each unit in FIG. 12 may be implemented by software, hardware, or a combination thereof. A unit implemented by hardware may include a logic circuit, an algorithm circuit, an analog circuit, or the like. A unit implemented by software may include a program instruction, is considered as a software product stored in a memory, and may be run by a processor to implement a related function. For details, refer to the foregoing descriptions.

Figure 13:
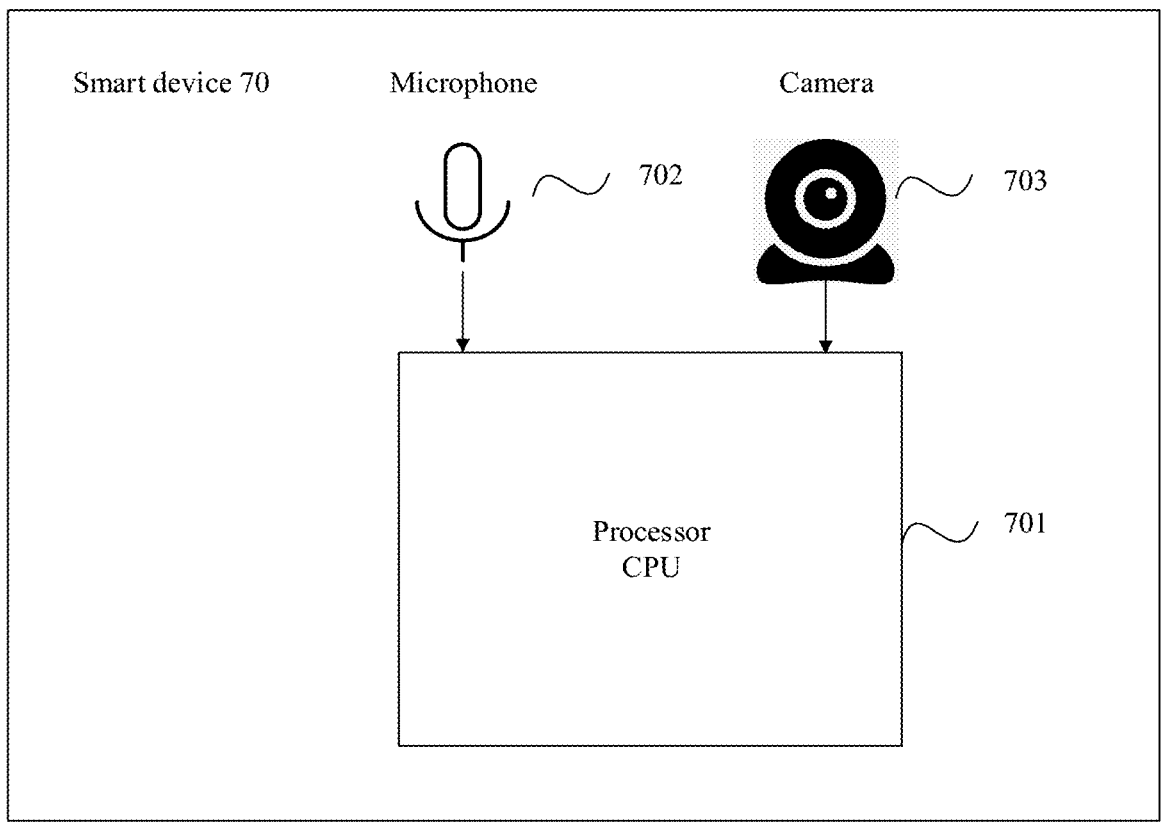
FIG. 13 is a schematic structural diagram of another smart device according to an embodiment of the present application.

FIG. 13 is a schematic structural diagram of another smart device according to an embodiment of the present application. The smart device may be a smart robot, a smartphone, a smart speaker, a smart wearable device, or the like. The smart device 70 may include a processor 701, and a microphone 702 and a camera 703 that are coupled to the processor 701.

The microphone 702 is configured to collect audio data.
The camera 703 is configured to collect video data.
The processor 701 is configured to: obtain the audio data and the video data;
extract to-be-recognized audio information from the audio data, where the to-be-recognized audio information includes an audio waveform sequence in a target time period; and
extract lip movement information of N users from the video data, where each of the lip movement information of the N users includes a sequence of lip movement images of a corresponding user in the target time period, and N is an integer greater than 1.

It should be noted that, for functions of the related modules of the smart device 70 described in this embodiment of the present application, reference may be made to the related method embodiments in FIG. 1 to FIG. 9F, and therefore details are not described herein again.

Figure 14:
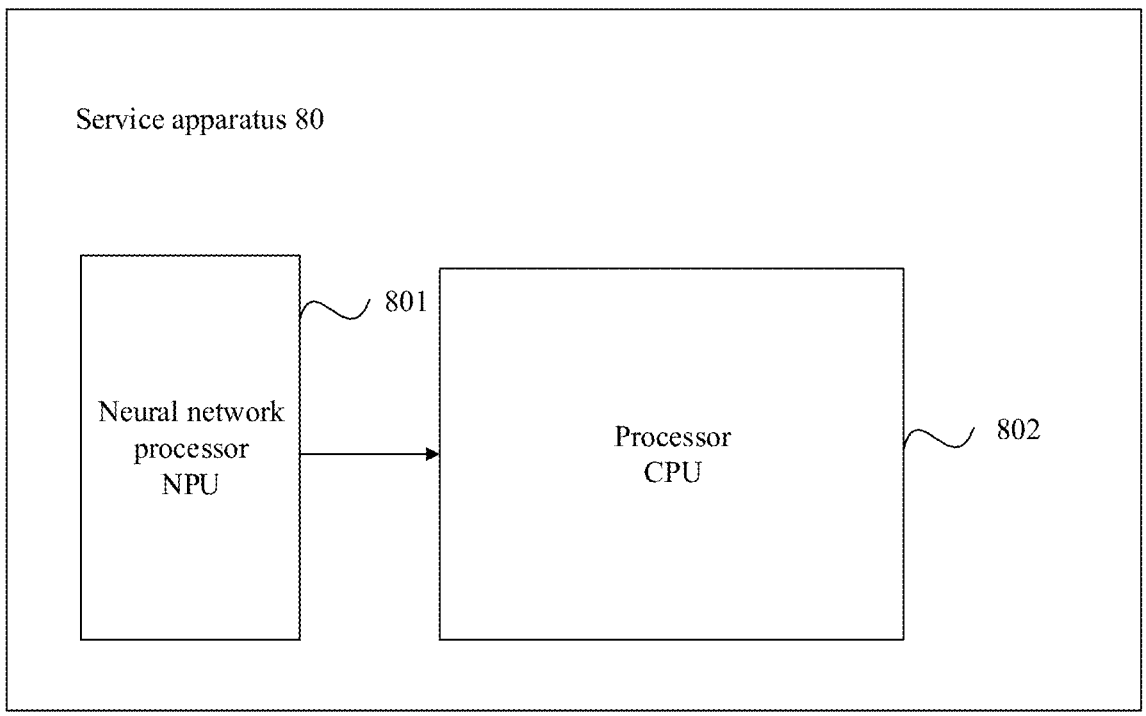
FIG. 14 is a schematic structural diagram of a service apparatus according to an embodiment of the present application.

FIG. 14 is a schematic structural diagram of a service apparatus according to an embodiment of the present application. The service apparatus may be a server, a cloud server, or the like. The service apparatus 80 may include a processor. Optionally, the processor may include a neural network processor 801 and a processor 802 coupled to the neural network processor 801.

The neural network processor 801 is configured to:
obtain to-be-recognized audio information and lip movement information of N users;
input the to-be-recognized audio information and the lip movement information of the N users into a target feature matching model, to obtain a matching degree between each of the lip movement information of the N users and the to-be-recognized audio information; and
determine a user corresponding to the lip movement information of the user with the highest matching degree as the target user to which the to-be-recognized audio information belongs.

In a possible implementation, the target feature matching model includes a first model, a second model, and a third model; and the neural network processor 801 is configured to:

input the to-be-recognized audio information into the first model, to obtain an audio feature, where the audio feature is a K-dimensional audio feature, and K is an integer greater than 0;

input the lip movement information of the N users into the second model, to obtain N image sequence features, where each of the N image sequence features is a K-dimensional image sequence feature; and input the audio feature and the N image sequence features into the third model, to obtain a matching degree between each of the N image sequence features and the audio feature.

In a possible implementation, the target feature matching model is a feature matching model obtained through training by using lip movement information of a trained user and M pieces of audio information as inputs and by using matching degrees between the lip movement information of the trained user and the M pieces of audio information as M labels.

In a possible implementation, the server further includes the processor 802, and the processor 802 is configured to:

determine user information of the target user, where the user information includes one or more of character attribute information, facial expression information corresponding to the to-be-recognized audio information, and environment information corresponding to the to-be-recognized audio information; and generate, based on the user information, a control instruction that matches the user information.

In a possible implementation, the server further includes the processor 802, and the processor 802 is further configured to:

recognize N face regions in video data based on a face recognition algorithm, and extract a lip movement video in each of the N face regions; and determine the lip movement information of the N users based on the lip movement video in each face region.

In a possible implementation, the server further includes the processor 802, and the processor 802 is further configured to:

recognize audio data with different spectrums from the audio data based on a spectrum recognition algorithm, and recognize audio data with a target spectrum as the to-be-recognized audio information.

It should be noted that, for functions of the related modules of the audio matching apparatus 50 described in this embodiment of the present application, reference may be made to the related method embodiments in FIG. 1 to FIG. 9F, and therefore details are not described herein again.

Figure 15:
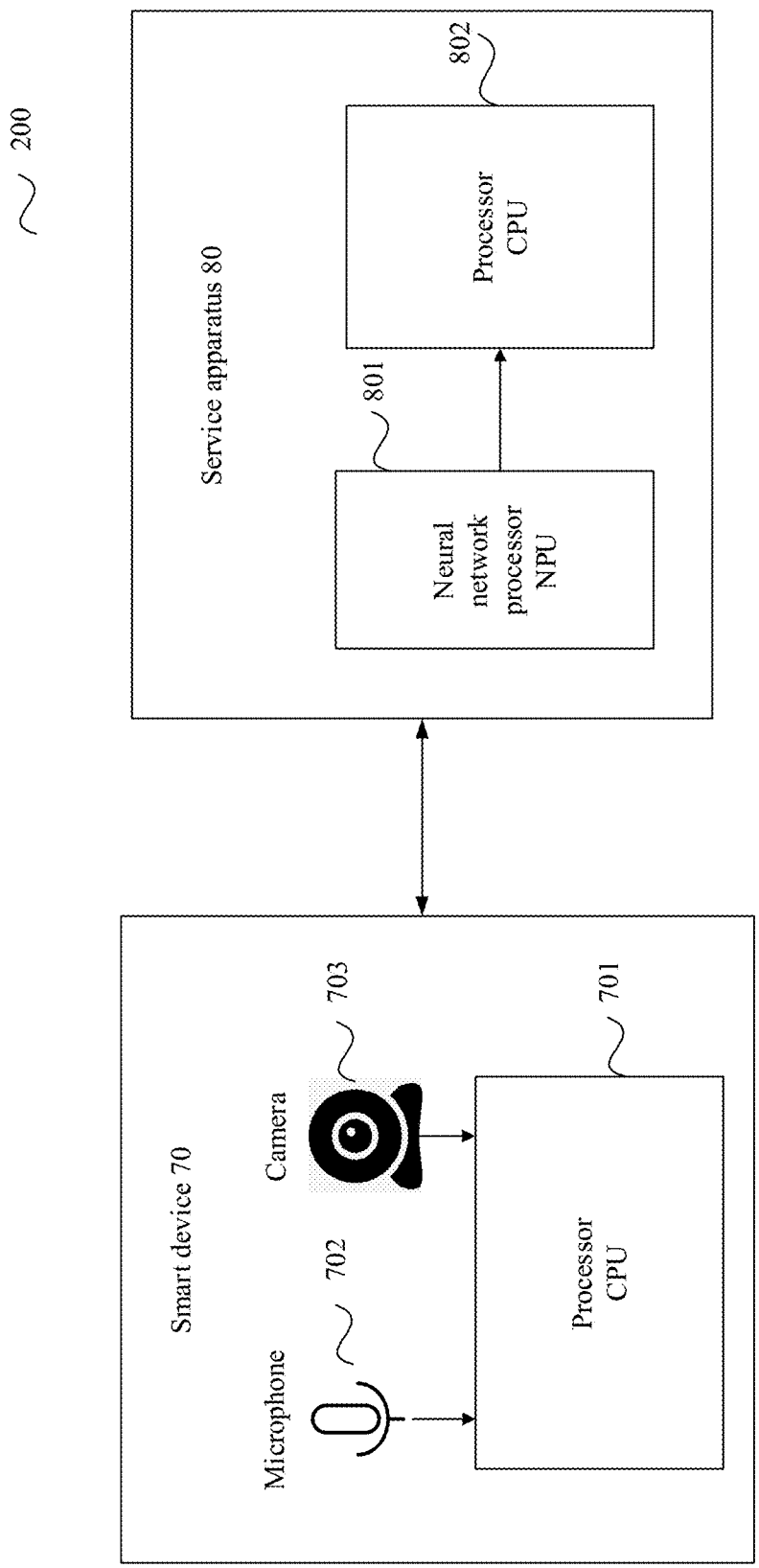
FIG. 15 shows another audio matching system according to an embodiment of the present application.

FIG. 15 shows another audio matching system 200 according to an embodiment of the present application. The system includes the foregoing smart device 70 and the foregoing service apparatus 80. The smart device 70 and the service apparatus 80 interact with each other to implement any one of the audio matching methods in this application. For functions of the system, refer to the foregoing related method embodiments in FIG. 1 to FIG. 9F. Details are not described herein again.

An embodiment of the present application further provides a computer storage medium. The computer storage medium may store a program, and when the program is executed, some or all of the steps described in any one of the foregoing method embodiments may be performed.

An embodiment of the present application further provides a computer program. The computer program includes instructions. When the computer program is executed by a computer, the computer is enabled to perform some or all of the steps described in any one of the foregoing method embodiments.

The foregoing embodiments are described from respective focuses. For a part that is not described in detail in an embodiment, refer to related descriptions in other embodiments.

It should be noted that, for brief description, the foregoing method embodiments are represented as a series of action combinations. However, persons skilled in the art should appreciate that this application is not limited to the described orders of the actions, because according to this application, some steps may be performed in other orders or simultaneously performed. It should be further appreciated by persons skilled in the art that the embodiments described in this specification all belong to preferred embodiments, and the involved actions and modules are not necessarily required in this application.

In the several embodiments provided in this application, it should be understood that the disclosed apparatus may be implemented in another manner. For example, the described apparatus embodiment is merely an example. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The foregoing units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the foregoing integrated unit is implemented in the form of a software functional unit and sold or used as an independent product, the integrated unit may be stored in a computer-readable storage medium. Based on such an understanding, the technical solutions of this application essentially, or the part contributing to the conventional technology, or all or some of the technical solutions may be implemented in the form of a software product. The computer software product is stored in a storage medium and includes several instructions for instructing a computer device (which may be a personal computer, a server, a network device, or the like, and may be a processor in the computer device) to perform all or some of the steps of the methods described in the embodiments of this application. The storage medium may include any medium that can store program code, such as a USB flash drive, a removable hard disk, a magnetic disk, an optical disc, a read-only memory (ROM), or a random access memory (RAM).

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. An audio matching method, comprising:
   obtaining audio data and video data;
   extracting to-be-recognized audio information from the audio data, wherein the to-be-recognized audio information comprises an audio waveform sequence in a target time period;
   extracting lip movement information of each user in N users from the video data, wherein the lip movement information of a user in the N users comprises a sequence of lip movement images of the user in the target time period, and N is an integer greater than 1, and wherein the extracting of the lip movement information comprises obtaining N face regions in the video data based on a face recognition algorithm and assigning a face ID to each face region;
   inputting the to-be-recognized audio information and the lip movement information of each user in the N users into a target feature matching model, to obtain a matching degree between the lip movement information of each user in the N users and the to-be-recognized audio information, where the matching degree corresponds to a non-binary value; and
   determining a user corresponding to lip movement information with a highest matching degree as a target user to which the to-be-recognized audio information belongs;
   calculating at least one angle based on a boundary of a face of the target user and a width of a field of view of a camera associated with a robot, wherein the calculating the at least one angle is performed in response to the determining the user as the target user;
   driving a motor of the robot, based on the at least one angle, to cause the robot to turn to the target user.

2. The method according to claim 1, wherein the extracting of the lip movement information of each user in the N users from the video data further comprises:
   extracting a lip movement video in each of the N face regions; and
   determining the lip movement information of each user in the N users based on the lip movement video in each face region.

3. The method according to claim 2, wherein the extracting the lip movement video in each of the N face regions comprises extracting a video sequence stream for a mouth region by using each face region as a unit.

4. The method according to claim 1, wherein the target feature matching model comprises a first model, a second model, and a third model; and
   the inputting of the to-be-recognized audio information and the lip movement information of each user in the N users into a target feature matching model, to obtain a matching degree between the lip movement information of each user in the N users and the to-be-recognized audio information comprises:
   inputting the to-be-recognized audio information into the first model, to obtain an audio feature, wherein the audio feature is a K-dimensional audio feature, and K is an integer greater than 0;
   inputting the lip movement information of each user in the N users into the second model, to obtain N image sequence features, wherein each of the N image sequence features is a K-dimensional image sequence feature; and
   inputting the audio feature and the N image sequence features into the third model, to obtain a matching degree between each of the N image sequence features and the audio feature.

5. The method according to claim 1, wherein the target feature matching model is a feature matching model obtained through training by using lip movement information of a trained user and M pieces of audio information as inputs and by using matching degrees between the lip movement information of the trained user and the M pieces of audio information as M labels.

6. The method according to claim 1, wherein the method further comprises:
   determining user information of the target user, wherein the user information comprises one or more of character attribute information, facial expression information corresponding to the to-be-recognized audio information, and environment information corresponding to the to-be-recognized audio information; and
   generating, based on the user information, a control instruction that matches the user information.

7. The method according to claim 1, wherein the extracting of the to-be-recognized audio information from the audio data comprises:
   recognizing audio data with different spectrums from the audio data based on a spectrum recognition algorithm, and recognizing audio data with a target spectrum as the to-be-recognized audio information.

8. A smart robot device, comprising a processor, and a microphone and a camera that are coupled to the processor, wherein
   the microphone is configured to collect audio data;
   the camera is configured to collect video data; and
   the processor is configured to:
   obtain the audio data and the video data;
   extract to-be-recognized audio information from the audio data, wherein the to-be-recognized audio information comprises an audio waveform sequence in a target time period;
   extract lip movement information of each user in N users from the video data, wherein the lip movement information of a user in the N users comprises a sequence of lip movement images of the user in the target time period, and N is an integer greater than 1, and wherein the extracting of the lip movement information comprises obtaining N face regions in the video data based on a face recognition algorithm and assigning a face ID to each face region;
   input the to-be-recognized audio information and the lip movement information of each user in the N users into a target feature matching model, to obtain a matching degree between the lip movement information of each user in the N users and the to-be-recognized audio information, where the matching degree corresponds to a non-binary value; and
   determine a user corresponding to lip movement information with a highest matching degree as a target user to which the to-be-recognized audio information belongs;
   calculate at least one angle based on a boundary of a face of the target user and a width of a field of view of the camera associated with the robot, wherein the calculating the at least one angle is performed in response to the determining the user as the target user;

drive a motor of the robot, based on the at least one angle, to cause the robot to turn to the target user.

9. The smart device according to claim 8, wherein the target feature matching model comprises a first model, a second model, and a third model; and the processor is configured to:
input the to-be-recognized audio information into the first model, to obtain an audio feature, wherein the audio feature is a K-dimensional audio feature, and K is an integer greater than 0;
input the lip movement information of each user in the N users into the second model, to obtain N image sequence features, wherein each of the N image sequence features is a K-dimensional image sequence feature; and
input the audio feature and the N image sequence features into the third model, to obtain a matching degree between each of the N image sequence features and the audio feature.

10. The smart device according to claim 8, wherein the target feature matching model is a feature matching model obtained through training by using lip movement information of a trained user and M pieces of audio information as inputs and by using matching degrees between the lip movement information of the trained user and the M pieces of audio information as M labels.

11. The smart device according to claim 8, wherein the processor is further configured to:
determine user information of the target user, wherein the user information comprises one or more of character attribute information, facial expression information corresponding to the to-be-recognized audio information, and environment information corresponding to the to-be-recognized audio information; and
generate, based on the user information, a control instruction that matches the user information.

12. The smart device according to claim 8, wherein the processor is configured to:
extract a lip movement video in each of the N face regions; and
determine the lip movement information of each user in the N users based on the lip movement video in each face region.

13. The smart device according to claim 8, wherein the processor is configured to:
recognize audio data with different spectrums from the audio data based on a spectrum recognition algorithm, and recognize audio data with a target spectrum as the to-be-recognized audio information.

14. A non-transitory computer-readable storage medium comprising instructions which are executed by a processor to cause a device to:
obtain audio data and video data;
extract to-be-recognized audio information from the audio data, wherein the to-be-recognized audio information comprises an audio waveform sequence in a target time period;
extract lip movement information of each user in N users from the video data, wherein the lip movement information of a user in the N users comprises a sequence of lip movement images of the user in the target time period, and N is an integer greater than 1, and wherein the extracting of the lip movement information comprises obtaining N face regions in the video data based on a face recognition algorithm and assigning a face ID to each face region;
input the to-be-recognized audio information and the lip movement information of each user in the N users into a target feature matching model, to obtain a matching degree between the lip movement information of each user in the N users and the to-be-recognized audio information, where the matching degree corresponds to a non-binary value; and
determine a user corresponding to lip movement information with a highest matching degree as a target user to which the to-be-recognized audio information belongs;
calculate at least one angle based on a boundary of a face of the target user and a width of a field of view of a camera associated with a robot, wherein the calculating the at least one angle is performed in response to the determining the user as the target user;
drive a motor of the robot, based on the at least one angle, to cause the robot to turn to the target user.

15. The non-transitory computer-readable storage medium according to claim 14, wherein the extracting of the lip movement information of each user in the N users from the video data further comprises:
extracting a lip movement video in each of the N face regions; and
determining the lip movement information of each user in the N users based on the lip movement video in each face region.

16. The non-transitory computer-readable storage medium according to claim 15, wherein the extracting the lip movement video in each of the N face regions comprises extracting a video sequence stream for a mouth region by using each face region as a unit.

17. The non-transitory computer-readable storage medium according to claim 14, wherein the target feature matching model comprises a first model, a second model, and a third model; and the device is further caused to:
input the to-be-recognized audio information into the first model, to obtain an audio feature, wherein the audio feature is a K-dimensional audio feature, and K is an integer greater than 0;
input the lip movement information of each user in the N users into the second model, to obtain N image sequence features, wherein each of the N image sequence features is a K-dimensional image sequence feature; and
input the audio feature and the N image sequence features into the third model, to obtain a matching degree between each of the N image sequence features and the audio feature.

18. The non-transitory computer-readable storage medium according to claim 14, wherein the target feature matching model is a feature matching model obtained through training by using lip movement information of a trained user and M pieces of audio information as inputs and by using matching degrees between the lip movement information of the trained user and the M pieces of audio information as M labels.

19. The non-transitory computer-readable storage medium according to claim 14, wherein the device is further caused to:
determine user information of the target user, wherein the user information comprises one or more of character attribute information, facial expression information corresponding to the to-be-recognized audio information, and environment information corresponding to the to-be-recognized audio information; and generate, based on the user information, a control instruction that matches the user information.

20. The non-transitory computer-readable storage medium according to claim 14, wherein the extracting of the to-be-recognized audio information from the audio data comprises:
recognizing audio data with different spectrums from the audio data based on a spectrum recognition algorithm, and recognizing audio data with a target spectrum as the to-be-recognized audio information.

* * * * *